United States Patent
Kawakubo

(10) Patent No.: US 8,529,641 B2
(45) Date of Patent: Sep. 10, 2013

(54) ELECTROLYTIC CAPACITOR AND METHOD OF MANUFACTURING THE SAME

(75) Inventor: Tetsuya Kawakubo, Takeo (JP)

(73) Assignees: SANYO Electric Co., Ltd., Moriguchi-shi (JP); SAGA SANYO INDUSTRIES Co., Ltd., Kishima-gun, Saga (JP)

( * ) Notice: Subject to any disclaimer, the term of this patent is extended or adjusted under 35 U.S.C. 154(b) by 301 days.

(21) Appl. No.: 13/071,694

(22) Filed: Mar. 25, 2011

(65) Prior Publication Data

US 2011/0235238 A1    Sep. 29, 2011

(30) Foreign Application Priority Data

Mar. 26, 2010   (JP) .................................. 2010-072142

(51) Int. Cl.
*H01G 9/00* (2006.01)

(52) U.S. Cl.
USPC ....................................................... 29/25.03

(58) Field of Classification Search
None
See application file for complete search history.

(56) References Cited

U.S. PATENT DOCUMENTS

| | | | | |
|---|---|---|---|---|
| 8,206,466 B2 * | 6/2012 | Kawakubo et al. | .......... | 29/25.03 |
| 8,320,105 B2 * | 11/2012 | Fujimoto | ...................... | 361/512 |
| 2008/0241705 A1 * | 10/2008 | Wakita et al. | ................. | 429/344 |

FOREIGN PATENT DOCUMENTS

JP    2004-179621 A    6/2004

* cited by examiner

*Primary Examiner* — Seahvosh Nikmanesh
(74) *Attorney, Agent, or Firm* — Westerman, Hattori, Daniels & Adrian, LLP

(57) ABSTRACT

At least any of a second cathode lead terminal and a second anode lead terminal has such a construction that a lead portion is shifted with respect to a connection portion orthogonally. A first cathode lead terminal is closer to one end of a cathode foil than the second cathode lead terminal and a first anode lead terminal is closer to one end of an anode foil than the second anode lead terminal. A core has first and second lengths along first and second straight lines passing through a core axis, respectively. The first length is smaller than the second length. The cathode and anode foils are wound together around the core from the one end of each of the cathode and anode foils. The second straight line lies between the first cathode and anode lead terminals and the first straight line lies between the second cathode and anode lead terminals.

11 Claims, 20 Drawing Sheets

ELECTROLYTIC CAPACITOR AND METHOD OF MANUFACTURING THE SAME

This nonprovisional application is based on Japanese Patent Application No. 2010-072142 filed with the Japan Patent Office on Mar. 26, 2010, the entire contents of which are hereby incorporated by reference,

BACKGROUND OF THE INVENTION

1. Field of the Invention

The present invention relates to an electrolytic capacitor and a method of manufacturing the same.

2. Description of the Related Art

An electrolytic capacitor including a capacitor element having an anode foil and a cathode foil wound together around an axis and an electrode lead attached to each of them has widely been used. For example, Japanese Patent Laying-Open No. 2004-179621 discloses an electrolytic capacitor in which a capacitor element has two cathode lead terminals and two anode lead terminals, that is, four lead terminals in total. A plurality of cathode lead terminals and anode lead terminals are provided, in order to lower equivalent series inductance (ESL) and equivalent series resistance (ESR). In addition, this capacitor element is accommodated in a cylindrical exterior case with a bottom and an opening portion of the exterior case is hermetically sealed as it is pressed in a lateral direction and curled together with opening sealing rubber.

In the technique described in the publication above, in sealing the capacitor element, a perimeter of the opening portion of the case is deformed so as to be brought closer to a lead terminal. In this deformation, in order to avoid collision of the perimeter of the opening portion with the lead terminal, a larger case in which a larger opening portion can be provided has been employed. Consequently, a size of an electrolytic capacitor has been large.

SUMMARY OF THE INVENTION

A method of manufacturing an electrolytic capacitor according to one aspect of the present invention has the following steps.

A cathode foil having one end is prepared. In addition, an anode foil having one end is prepared. Four terminals are prepared as first and second cathode lead terminals and first and second anode lead terminals, respectively. Each of the four terminals has a connection portion and a lead portion. Each of the connection portion and the lead portion extends in a lead direction. At least any of the second cathode lead terminal and the second anode lead terminal has such a construction that the lead portion is shifted with respect to the connection portion in a shift direction orthogonal to the lead direction. The four terminals are attached. Specifically, the connection portion of each of the first and second cathode lead terminals is attached to the cathode foil and the connection portion of each of the first and second anode lead terminals is attached to the anode foil. It is noted that the first cathode lead terminal is arranged closer to one end of the cathode foil than the second cathode lead terminal and the first anode lead terminal is arranged closer to one end of the anode foil than the second anode lead terminal. A core having a core axis is prepared. In a cross-section perpendicular to the core axis, the core has a first length along a first straight line which passes through the core axis and a second length along a second straight line which passes through the core axis and is orthogonal to the first straight line. The first length is smaller than the second length. A capacitor element which has an element axis located in correspondence with the core axis is formed by winding the cathode foil and the anode foil together around the core from one end of each of the cathode foil and the anode foil after the step of attaching the four terminals. The step of forming a capacitor element is performed such that, in the cross-section above, the second straight line lies between the first cathode lead terminal and the first anode lead terminal and the first straight line lies between the second cathode lead terminal and the second anode lead terminal. In addition, the step of forming a capacitor element is performed such that the shift direction of at least any of the second cathode lead terminal and the second anode lead terminal has a component toward the core axis. The core is removed after the step of forming a capacitor element. After the step of removing the core, the cathode foil and the anode foil are sealed while exposing the lead portion of each of the four terminals. The sealing step is performed as follows. Initially, a case having an opening portion is prepared. The cathode foil and the anode foil are accommodated in the case through the opening portion such that the lead portion of each of the four terminals protrudes through the opening portion. The case is fixed by causing the opening portion to contract toward the element axis.

A method of manufacturing an electrolytic capacitor according to another aspect of the present invention has the following steps.

A cathode foil having one end is prepared. An anode foil having one end is prepared. Four terminals are prepared as first and second cathode lead terminals and first and second anode lead terminals, respectively. Each of the four terminals has a connection portion and a lead portion. Each of the connection portion and the lead portion extends in a lead direction. At least any of the four terminals has such a construction that the lead portion is shifted with respect to the connection portion in a shift direction orthogonal to the lead direction. The four terminals are attached. Specifically, the connection portion of each of the first and second cathode lead terminals is attached to the cathode foil and the connection portion of each of the first and second anode lead terminals is attached to the anode foil. It is noted that the first cathode lead terminal is arranged closer to one end of the cathode foil than the second cathode lead terminal and the first anode lead terminal is arranged closer to one end of the anode foil than the second anode lead terminal. A core having a core axis is prepared. In a cross-section perpendicular to the core axis, the core has a first length along a first straight line which passes through the core axis and a second length along a second straight line which passes through the core axis and is orthogonal to the first straight line. The first length is smaller than the second length. A capacitor element which has an element axis located in correspondence with the core axis is formed by winding the cathode foil and the anode foil together around the core from one end of each of the cathode foil and the anode foil after the step of attaching the four terminals. The step of forming a capacitor element is performed such that, in the cross-section above, the first straight line lies between the first cathode lead terminal and the first anode lead terminal and the second straight line lies between the second cathode lead terminal and the second anode lead terminal. The core is removed after the step of forming a capacitor element. After the step of removing the core, the cathode foil and the anode foil are sealed while exposing the lead portion of each of the four terminals. The sealing step is performed as follows. Initially, a case having an opening portion is prepared. The cathode foil and the anode foil are accommodated in the case through the opening portion such that the lead portion of each of the four terminals protrudes through the opening portion. The case is fixed by causing the opening portion to contract toward the element axis.

An electrolytic capacitor according to one aspect of the present invention has a capacitor element and a sealing portion. The capacitor element includes four terminals and a cathode foil and an anode foil each of which has one end. The cathode foil and the anode foil are wound together around an element axis from one end of each of the cathode foil and the anode foil. In a cross-section perpendicular to the element axis, the capacitor element has a first length along a first straight line which passes through the element axis and a second length along a second straight line which passes through the element axis and is orthogonal to the first straight line. The first length is smaller than the second length. Each of the four terminals has a connection portion and a lead portion. Each of the connection portion and the lead portion extends in a lead direction. The four terminals consist of first and second cathode lead terminals and first and second anode lead terminals. The connection portion of each of the first and second cathode lead terminals is attached to the cathode foil and the connection portion of each of the first and second anode lead terminals is attached to the anode foil. The first cathode lead terminal is arranged closer to one end of the cathode foil than the second cathode lead terminal and the first anode lead terminal is arranged closer to one end of the anode foil than the second anode lead terminal. In the cross-section above, the second straight line lies between the first cathode lead terminal and the first anode lead terminal and the first straight line lies between the second cathode lead terminal and the second anode lead terminal. At least any of the second cathode lead terminal and the second anode lead terminal has such a construction that the lead portion is shifted with respect to the connection portion in a shift direction orthogonal to the lead direction. The shift direction of at least any of the second cathode lead terminal and the second anode lead terminal has a component toward the element axis. The sealing portion serves to seal the cathode foil and the anode foil while exposing the lead portion of each of the four terminals. The sealing portion includes a case having an opening portion. The cathode foil and the anode foil are accommodated in the case. The lead portion of each of the four terminals protrudes through the opening portion. The case is fixed by causing the opening portion to contract toward the element axis.

An electrolytic capacitor according to another aspect of the present invention has a capacitor element and a sealing portion. The capacitor element includes four terminals and a cathode foil and an anode foil each of which has one end. The cathode foil and the anode foil are wound together around an element axis from one end of each of the cathode foil and the anode foil. In a cross-section perpendicular to the element axis, the capacitor element has a first length along a first straight line which passes through the element axis and a second length along a second straight line which passes through the element axis and is orthogonal to the first straight line. The first length is smaller than the second length. Each of the four terminals has a connection portion and a lead portion. Each of the connection portion and the lead portion extends in a lead direction. The four terminals consist of first and second cathode lead terminals and first and second anode lead terminals. The connection portion of each of the first and second cathode lead terminals is attached to the cathode foil and the connection portion of each of the first and second anode lead terminals is attached to the anode foil. The first cathode lead terminal is arranged closer to one end of the cathode foil than the second cathode lead terminal and the first anode lead terminal is arranged closer to one end of the anode foil than the second anode lead terminal. In the cross-section above, the first straight line lies between the first cathode lead terminal and the first anode lead terminal and the second straight line lies between the second cathode lead terminal and the second anode lead terminal. At least any of the four terminals has such a construction that the lead portion is shifted with respect to the connection portion in a shift direction orthogonal to the lead direction. The sealing portion serves to seal the cathode foil and the anode foil while exposing the lead portion of each of the four terminals. The sealing portion includes a case having an opening portion. The cathode foil and the anode foil are accommodated in the case. The lead portion of each of the four terminals protrudes through the opening portion. The case is fixed by causing the opening portion to contract toward the element axis.

As described above, according to the present invention, an electrolytic capacitor having a smaller size can be provided.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

An embodiment of the present invention will be described hereinafter with reference to the drawings.

(First Embodiment)

Figure 1:
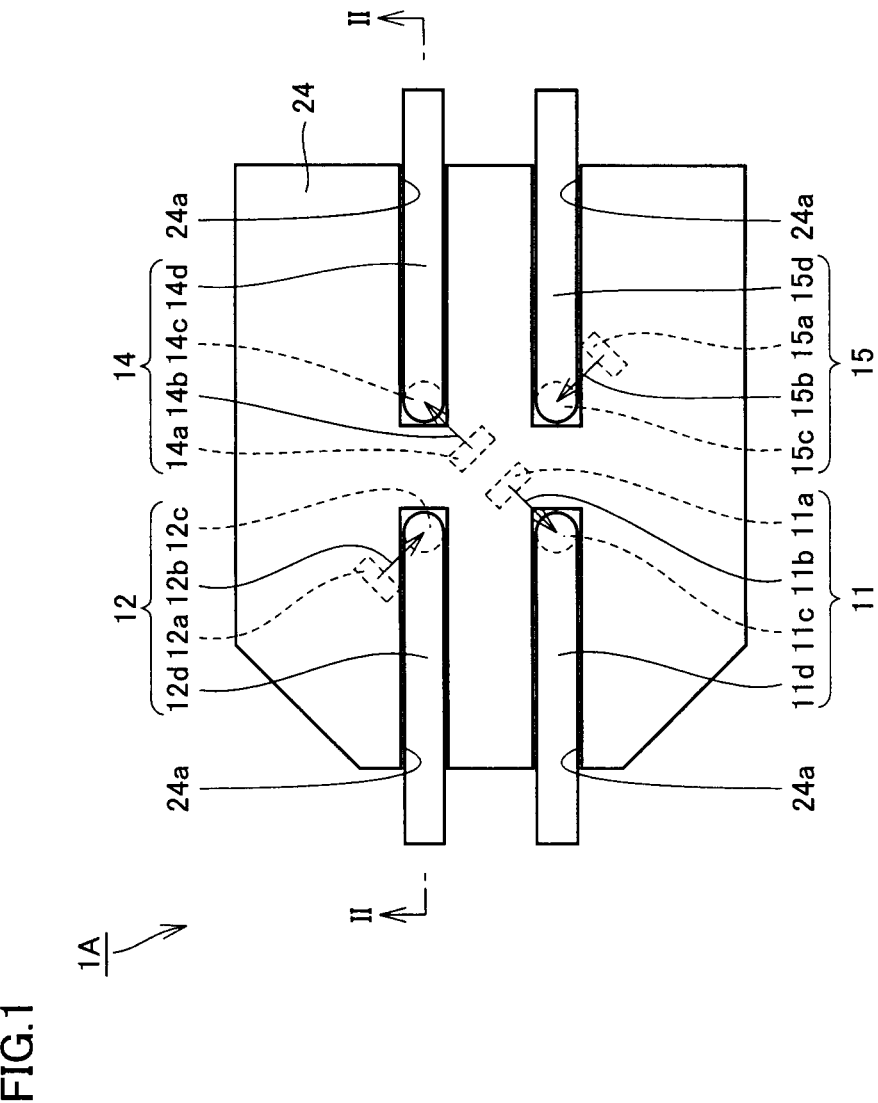
FIG. 1 is a plan view schematically showing a construction of an electrolytic capacitor in a first embodiment of the present invention.
Figure 2:
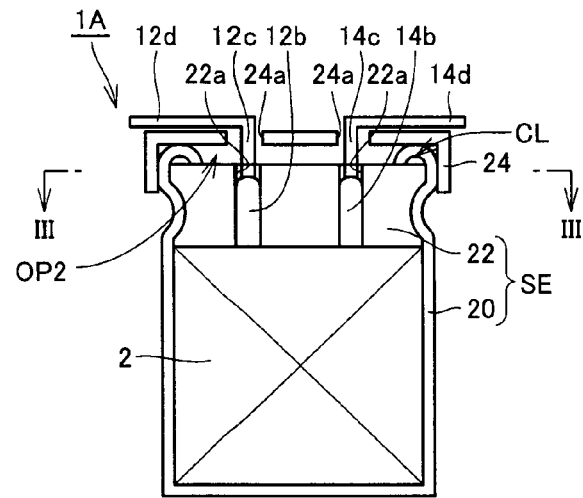
FIG. 2 is a schematic cross-sectional view along the line II-II in FIG. 1.
Figure 3:
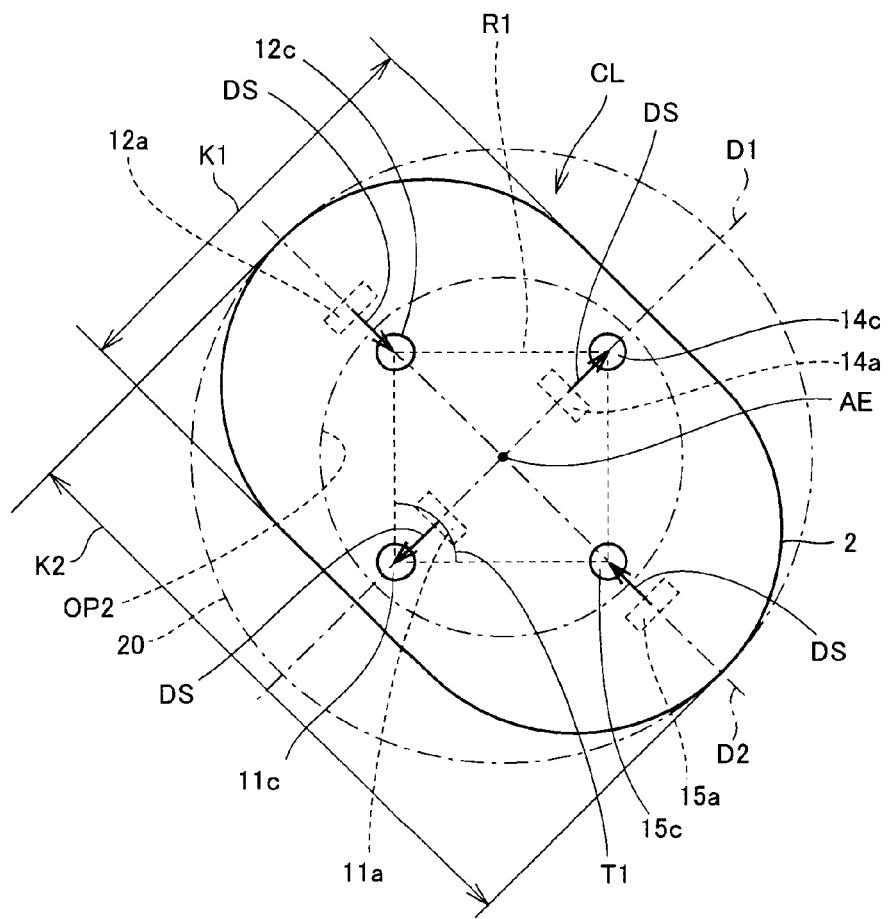
FIG. 3 is a diagram schematically showing a capacitor element and arrangement of an electrode lead terminal, along the line III-III in FIG. 2.

Referring mainly to FIGS. 1 to 3, a solid electrolytic capacitor 1A (electrolytic capacitor) in the present embodiment has a four-terminal structure, and has a capacitor element 2, a sealing portion SE, and a seat plate 24. Capacitor element 2 has a cathode foil 4 and an anode foil 3 (FIG. 5) and four terminals. These four terminals consist of a first cathode lead tab terminal 14 (first cathode lead terminal), a second cathode lead tab terminal 15 (second cathode lead terminal), a first anode lead tab terminal 11 (first anode lead terminal), and a second anode lead tab terminal 12 (second anode lead terminal). Though details will be described later, cathode foil 4 and anode foil 3 are wound together around an element axis AE (FIG. 3) from one end H1 of each of cathode foil 4 and anode foil 3. It is noted that element axis AE herein is virtual and it does not indicate some kind of a member.

First cathode lead tab terminal 14 has a connection portion 14a, a boss portion 14b, a lead portion 14c, and a mount portion 14d, second cathode lead tab terminal 15 has a connection portion 15a, a boss portion 15b, a lead portion 15c, and a mount portion 15d, first anode lead tab terminal 11 has a connection portion 11a, a boss portion 11b, a lead portion 11c, and a mount portion 11d, and second anode lead tab terminal 12 has a connection portion 12a, a boss portion 12b, a lead portion 12c, and a mount portion 12d. It is noted that connection portions 11a, 12a, 14a, and 15a are also collectively referred to as a connection portion 10a (FIGS. 4A and 4B), boss portions 11b, 12b, 14b, and 15b are also collectively referred to as a boss portion 10bA, lead portions 11c, 12c, 14c, and 15c are also collectively referred to as a lead portion 10c, and mount portions 11d, 12d, 14d, and 15d are also collectively referred to as a mount portion 10d.

Figure 4A:
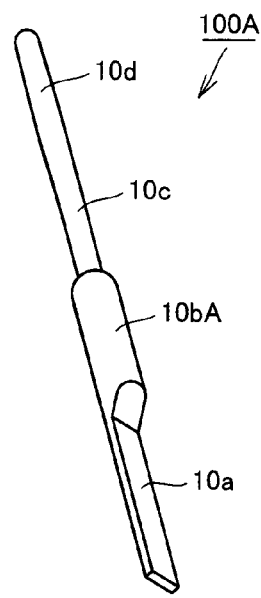
FIGS. 4A and 4B are a perspective view and a side view schematically showing a construction of a terminal prepared in a first step in a method of manufacturing an electrolytic capacitor in the first embodiment of the present invention, respectively.
Figure 4B:
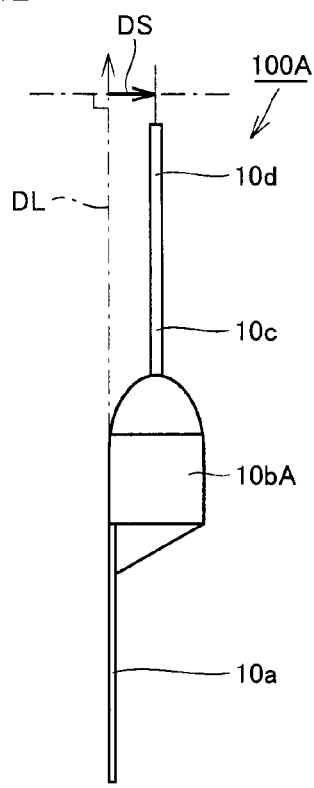

Each of first and second cathode lead tab terminals 14 and 15 and first and second anode lead tab terminals 11 and 12 has a construction of a one-side pressed terminal 100A (FIGS. 4A and 4B). Mount portion 10d can be bent as necessary, as shown in FIG. 2. Each of connection portion 10a and lead portion 10c extends in a lead direction DL. In addition, connection portion 10a and lead portion 10c are connected to each other by boss portion 10bA such that lead portion 10c is shifted with respect to connection portion 10a in a shift direction DS orthogonal to lead direction DL. Moreover, each of the four terminals above is attached such that lead direction DL (FIG. 4B) is in parallel to element axis AE (FIG. 3).

Figure 5:
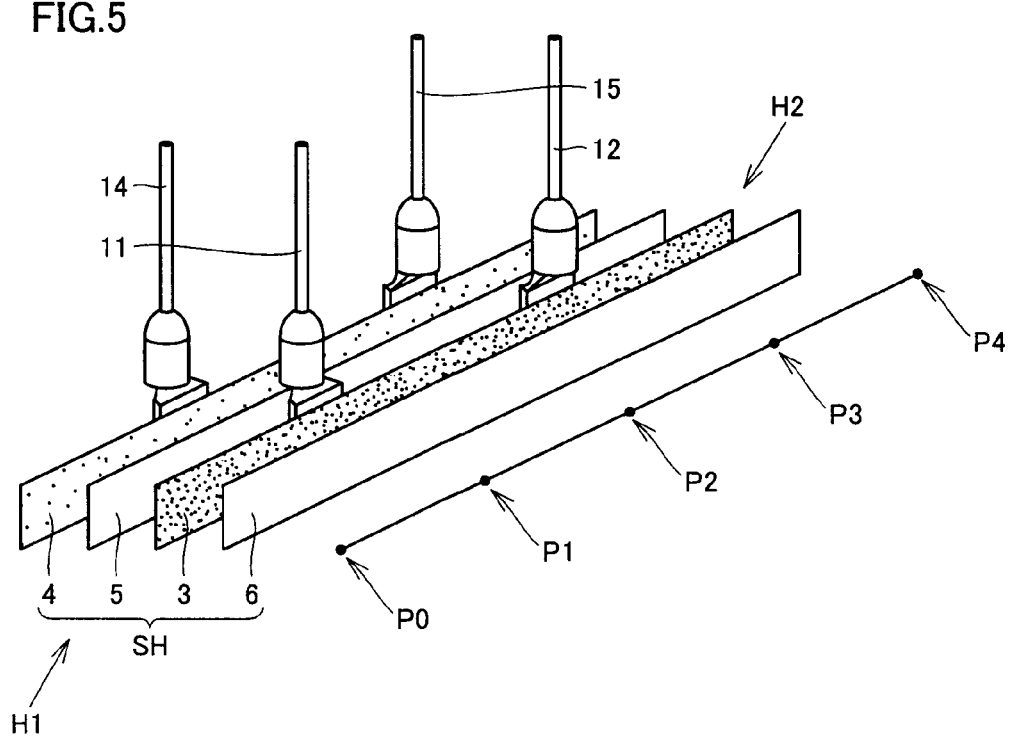
FIGS. 5 and 6 are perspective views schematically showing second and third steps in the method of manufacturing an electrolytic capacitor in the first embodiment of the present invention, respectively.

Connection portion 10a of each of first and second cathode lead tab terminals 14 and 15 is attached to cathode foil 4 (FIG. 5) and connection portion 10a of each of first and second anode lead tab terminals 11 and 12 is attached to anode foil 3 (FIG. 5). More specifically, first cathode lead tab terminal 14 is arranged closer to one end H1 of cathode foil 4 (the vicinity of a position P0 in FIG. 5 or a position of start of winding in FIG. 9) than second cathode lead tab terminal 15 in a direction of extension of cathode foil 4 (a direction along a straight line in FIG. 5 or a direction along a spiral in FIG. 9). First anode lead tab terminal 11 is arranged closer to one end H1 of anode foil 3 (the vicinity of position P0 in FIG. 5 or the position of start of winding in FIG. 9) than second anode lead tab terminal 12 in a direction of extension of anode foil 3 (the direction along the straight line in FIG. 5 or the direction along the spiral in FIG. 9).

In a cross-section perpendicular to element axis AE of capacitor element 2 (FIG. 3), capacitor element 2 has a first length K1 along a first straight line D1 passing through element axis AE and a second length K2 along a second straight line D2 passing through element axis AE and orthogonal to first straight line D1. First length K1 is smaller than second length K2. Specifically, an outer perimeter of capacitor element 2 is not in a circular shape but for example in a racetrack shape as shown in FIG. 3. Second straight line D2 lies between first cathode lead tab terminal 14 and first anode lead tab terminal 11 and first straight line D1 lies between second cathode lead tab terminal 15 and second anode lead tab terminal 12. In addition, in this cross-section, each of first and second straight lines D1 and D2 is substantially an axis of symmetry of the outer perimeter of capacitor element 2.

Shift direction DS (FIG. 3) of each of second cathode lead tab terminal 15 and second anode lead tab terminal 12 has a component toward element axis AE and it is preferably directed to element axis AE. Shift direction DS (FIG. 3) of each of first cathode lead tab terminal 14 and first anode lead tab terminal 11 has a component away from element axis AE and it is preferably directed to a direction opposite to the direction toward element axis AE. According to the construction above, lead portions 11c, 12c, 14c, and 15c are arranged at positions corresponding to four respective vertices of a quadrangle R1 (FIG. 3). This quadrangle R1 is substantially a square having element axis AE in the center, and hence an angle T1 (FIG. 3) has an angle of approximately 90° and specifically an angle, for example, within 90°±20°.

Sealing portion SE (FIG. 2) serves to accommodate and seal cathode foil 4 and anode foil 3 while exposing lead portion 10c of each of first and second cathode lead tab terminals 14 and 15 and first and second anode lead tab terminals 11 and 12, and has an aluminum case 20 (case) and a sealing rubber gasket 22. Aluminum case 20 has an opening portion OP2. Lead portion 10c of each of first and second cathode lead tab terminals 14 and 15 and first and second anode lead tab terminals 11 and 12 protrudes through opening portion OP2.

Aluminum case 20 is fixed by causing opening portion OP2 to contract toward element axis AE. Specifically, a drawing process is performed to curl the perimeter of opening portion OP2 as shown in FIG. 2, and sealing is achieved in such a manner that aluminum case 20 tightens sealing rubber gasket 22 through this process. As a result of this process, a curled portion CL (FIGS. 2 and 3) is formed at the perimeter of opening portion OP2 of aluminum case 20 and opening portion OP2 is caused to contract toward element axis AE as a result of formation of this curled portion CL.

A method of manufacturing solid electrolytic capacitor 1A in the present embodiment will now be described.

Referring mainly to FIGS. 4A and 4B, one-side pressed terminal 100A is formed as each of lead tab terminals 11, 12, 14, and 15 above (FIGS. 1 and 2). One-side pressed terminal 100A has connection portion 10a, boss portion 10bA, lead portion 10c, and mount portion 10d. Connection portion 10a has a plate-like shape, boss portion 10bA has a columnar shape, and lead portion 10c and mount portion 10d have a columnar shape smaller in diameter than boss portion 10bA. Each of connection portion 10a and lead portion 10c extends in lead direction DL.

One-side pressed terminal 100A is molded in a shape asymmetrical with respect to lead portion 10c, mainly by using one of a pair of molds. Consequently, lead portion 10c is provided in the center of boss portion 10bA and connection portion 10a is provided on one side of boss portion 10bA (on the left side in FIG. 4B). Thus, lead portion 10c is shifted with respect to connection portion 10a in shift direction DS orthogonal to lead direction DL.

Referring further to FIG. 5, anode foil 3, cathode foil 4, and sheets of separator paper 5 and 6 are prepared. Each of anode foil 3 and cathode foil 4 has one end H1 (the vicinity of position P0 in the drawing) and the other end H2 (the vicinity of a position P4 in the drawing).

First and second anode lead tab terminals 11 and 12 are attached in the vicinity of a position P1 and a position P3 in the direction of extension of anode foil 3, respectively (the direction of the straight line in the drawing). Position P1 is closer to position P0 than position P3. Specifically, connection portion 10a (FIGS. 4A and 4B) of each of first and second anode lead tab terminals 11 and 12 is connected to anode foil 3. Preferably, a position P2 in the center of anode foil 3 extending from position P0 to position P4 is located between position P1 and position P3. More preferably, an interval between adjacent points among positions P0 to P4 is substantially equal. In this case, a distance between position P1 and position P3 corresponds to about half a length of anode foil 3.

In addition, first and second cathode lead tab terminals 14 and 15 are attached in the vicinity of position P1 and position P3 in the direction of extension of cathode foil 4, respectively (the direction of the straight line in the drawing). Position P1 is closer to position P0 than position P3. Specifically, connection portion 10a (FIGS. 4A and 4B) of each of first and second cathode lead tab terminals 14 and 15 is connected to cathode foil 4. Preferably, position P2 in the center of cathode foil 4 extending from position P0 to position P4 is located between position P1 and position P3. More preferably, an interval between adjacent points among positions P0 to P4 is substantially equal. In this case, a distance between position P1 and position P3 corresponds to about half a length of cathode foil 4.

It is noted that an attachment position of each of first and second anode lead tab terminals 11 and 12 and first and second cathode lead tab terminals 14 and 15 is finely adjusted such that each terminal is arranged as shown in FIG. 3 when anode foil 3 and cathode foil 4 are wound as will be described later.

Then, anode foil 3 and cathode foil 4 are layered with separator paper 5 being interposed. In addition, separator paper 6 is layered on anode foil 3. Namely, a stack sheet SH having anode foil 3, cathode foil 4 and sheets of separator paper 5 and 6 is prepared. It is noted that this layering may be performed simultaneously with winding which will be described later.

As a result of this layering, shift direction DS (FIG. 4B) of first and second anode lead tab terminals 11 and 12 is opposite to each other and the shift direction of second cathode lead tab terminals 14 and 15 is opposite to each other. In the present embodiment, the shift direction of each of first cathode lead tab terminal 14 and first anode lead tab terminal 11 is in a direction from anode foil 3 toward cathode foil 4 in FIG. 5, and the shift direction of each of second cathode lead tab terminal 15 and second anode lead tab terminal 12 is in a direction from cathode foil 4 toward anode foil 3 in FIG. 5.

Figure 6:
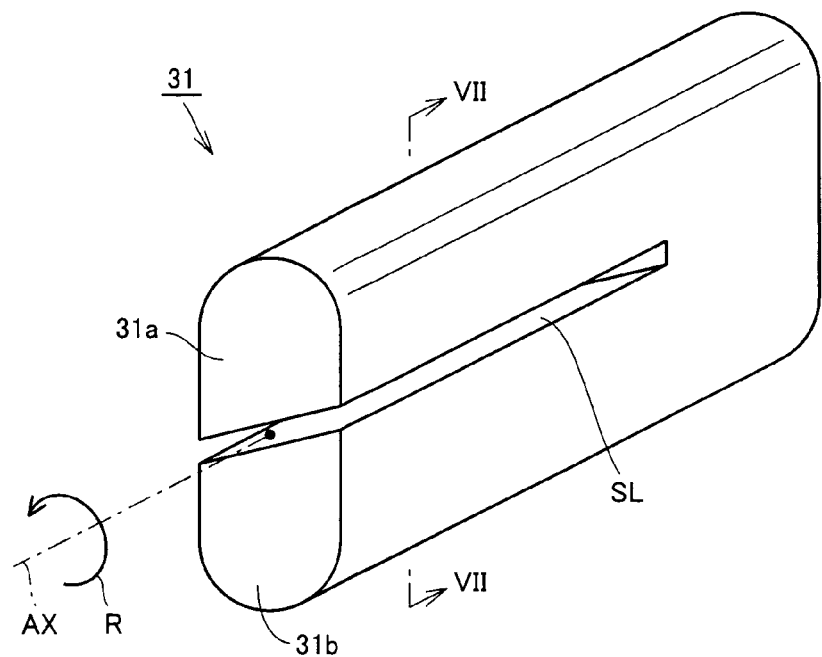

Referring to FIG. 6, a core 31 having core axis AX is prepared. A one end portion of core 31 on core axis AX (an end portion in lower left in the drawing) is divided into first and second portions 31a and 31b by a slit SL.

Figure 7:
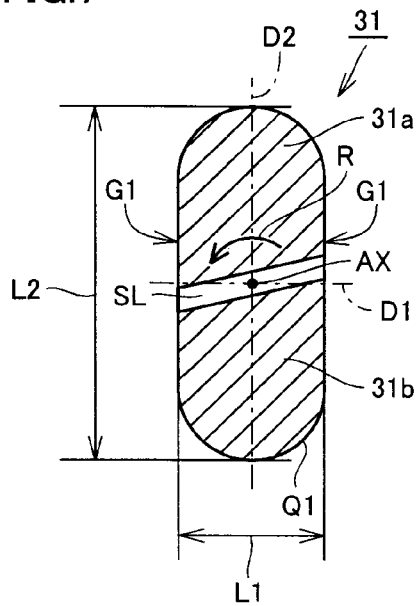
FIG. 7 is a schematic cross-sectional view along the line VII-VII in FIG. 6.

Referring to FIG. 7, in the cross-section perpendicular to core axis AX, core 31 has a first length L1 along first straight line D1 passing through core axis AX and a second length L2 along second straight line D2 passing through core axis AX and orthogonal to first straight line D1. First length L1 is smaller than second length L2. In addition, in this cross-section, each of first and second straight lines D1 and D2 is substantially an axis of symmetry of the outer perimeter of core 31. Specifically, a cross-section (FIG. 7) of core 31 has an outer perimeter in a racetrack shape Q1. It is noted that racetrack shape Q1 herein is a shape defined regardless of presence of slit SL.

More specifically, the cross-section of core 31 has a pair of straight line portions G1 (first straight line portion) opposed to each other along first straight line D1 and extending in parallel to second straight line D2. In addition, the cross-section of core 31 has a pair of curve portions (first curve portion) opposed to each other along second straight line D2 and being convex outward. Each curve portion is, for example, a part of a circle or an ellipse.

Figure 8:
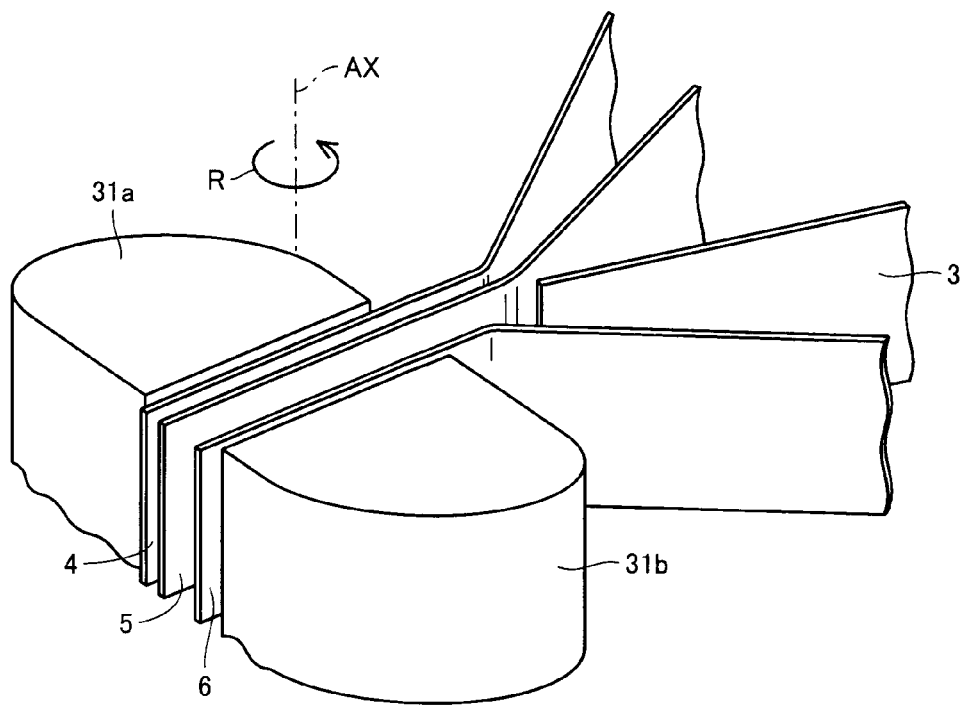
FIG. 8 is a perspective view schematically showing a fourth step in the method of manufacturing an electrolytic capacitor in the first embodiment of the present invention.

Referring mainly to FIG. 8, one end H1 (FIG. 5: the vicinity of position P0) of each of anode foil 3, cathode foil 4 and sheets of separator paper 5 and 6 is inserted in slit SL. Then, core 31 is turned around core axis AX as shown with an arrow R in FIGS. 6 to 8. Thus, separator paper 6, anode foil 3, separator paper 5, and cathode foil 4 start to be wound around core 31 as they are layered.

Figure 9:
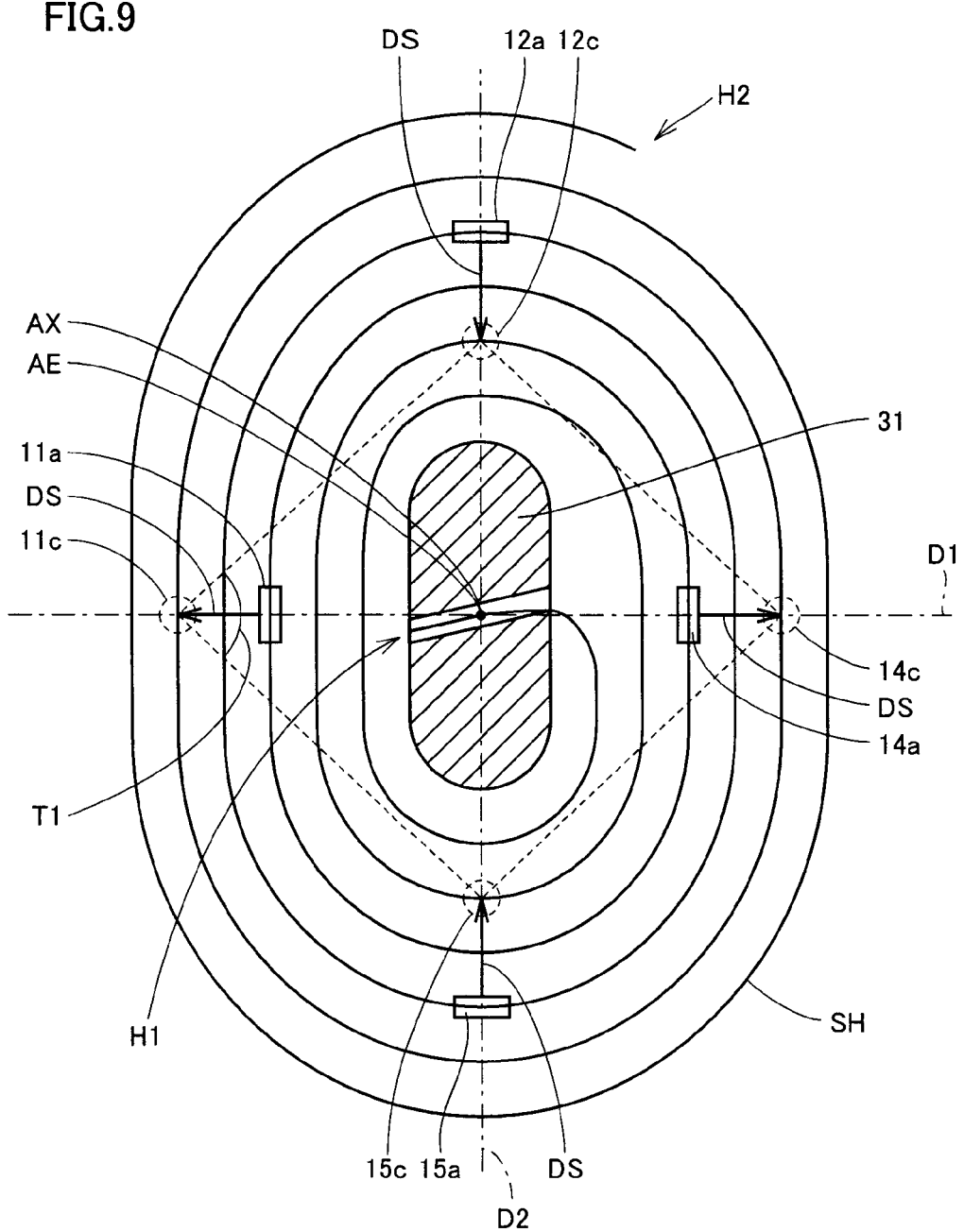
FIG. 9 is a cross-sectional view schematically showing a fifth step in the method of manufacturing an electrolytic capacitor in the first embodiment of the present invention.

Referring mainly to FIG. 9, stack sheet SH (FIG. 5: anode foil 3, cathode foil 4, and sheets of separator paper 5 and 6) is wound around core 31. Thus, cathode foil 4 and anode foil 3 are together wound around core 31 from one end H1 of each of cathode foil 4 and anode foil 3. This winding is performed such that, when viewed in cross-section, second straight line D2 lies between first cathode lead tab terminal 14 and first anode lead tab terminal 11 and first straight line D1 lies between second cathode lead tab terminal 15 and second anode lead tab terminal 12. In order to arrange each terminal as such, a position of attachment of each terminal (FIG. 5) should only finely be adjusted. As a result of winding above, shift direction DS (FIG. 4B) of each of second cathode lead tab terminal 15 and second anode lead tab terminal 12 has a component toward core axis AX and shift direction DS (FIG. 4B) of each of first cathode lead tab terminal 14 and first anode lead tab terminal 11 has a component away from core axis AX.

Figure 10:
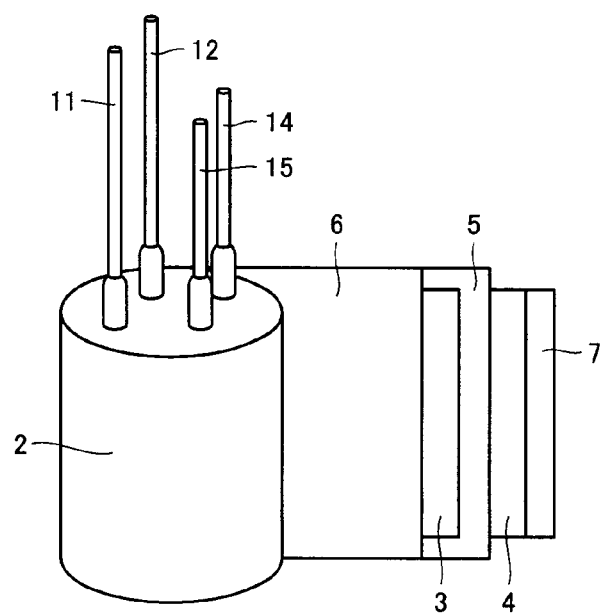
FIGS. 10 to 12 are perspective views schematically showing sixth to eighth steps in the method of manufacturing an electrolytic capacitor in the first embodiment of the present invention, respectively.

Referring further to FIG. 10, after winding above is completed, the other end H2 of cathode foil 4 (FIG. 5) is fixed by a tape 7. Then, core 31 is removed from wound stack sheet SH. Capacitor element 2 having element axis AE (FIG. 3) located in correspondence with core axis AX (FIG. 9) is thus obtained.

Then, a cut surface or the like of the anode foil or the like of capacitor element 2 is subjected to chemical conversion treatment and further to heat treatment at a temperature approximately from 150° C. to 300° C. Then, capacitor element 2 is impregnated with a solution mixture of a monomer forming a conductive polymer through polymerization, such as 3,4-ethylenedioxythiophene, and for example a ferric p-toluenesulfonate alcohol solution representing an oxidizing agent solution. Thereafter, through thermochemical polymerization, a conductive polymer layer (not shown) is formed between electrodes of capacitor element 2. Other than these materials, a conductive polymer material such as polypyrrole, polyfuran or polyaniline, or TCNQ complex salt (7,7,8,8-tetracyanoquinodimethane) may be used as an electrolyte.

Figure 11:
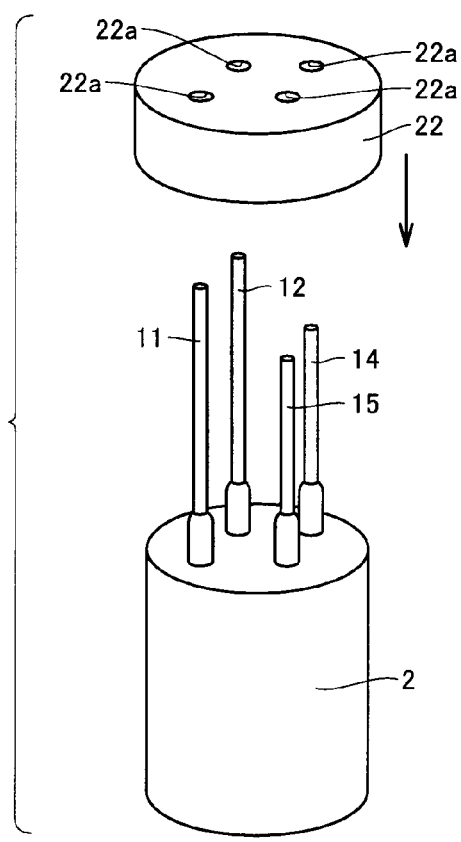

Referring to FIG. 11, sealing rubber gasket 22 is prepared. In sealing rubber gasket 22, an opening 22a is formed at a position corresponding to each of first and second anode lead tab terminals 11 and 12 and first and second cathode lead tab terminals 14 and 15. Then, as shown with an arrow in the drawing, first and second anode lead tab terminals 11 and 12 and first and second cathode lead tab terminals 14 and 15 are inserted in four respective openings 22a in sealing rubber gasket 22 in capacitor element 2. Sealing rubber gasket 22 is thus attached to capacitor element 2.

Figure 12:
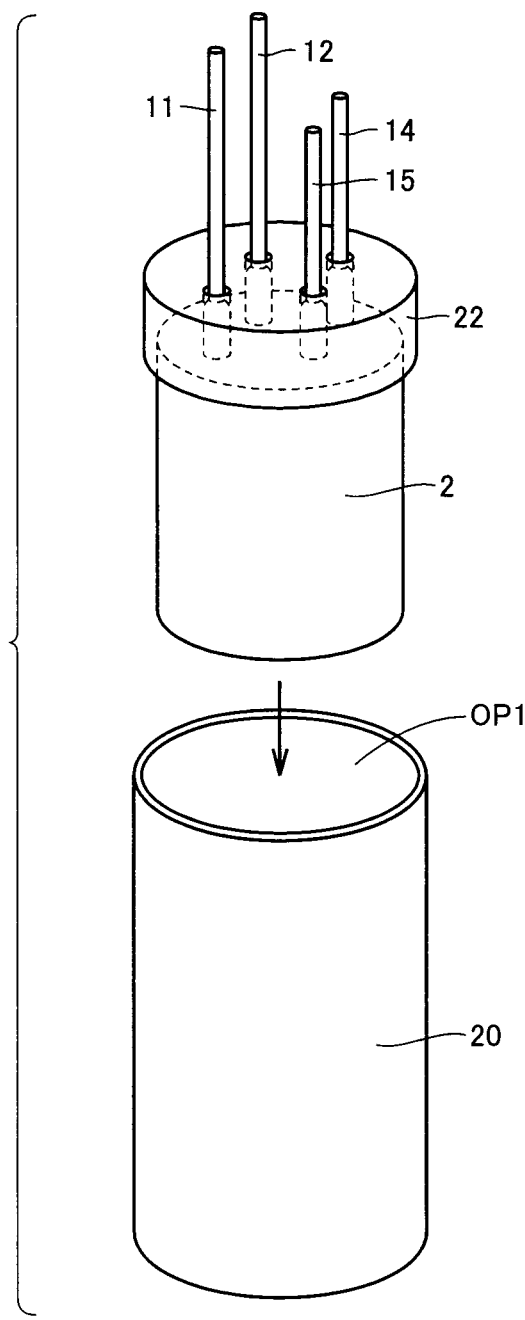

Referring to FIG. 12, aluminum case 20 with a bottom is prepared. At this time point, aluminum case 20 has a cylindrical shape, and has a bottom at one end surface (a lower end in FIG. 12) thereof and an opening portion OP1 at the other end surface (an upper end in FIG. 12) thereof. Then, cathode foil 4 and anode foil 3 that were wound together are accommodated in aluminum case 20 through opening portion OP1 such that lead portion 10c and mount portion 10d (FIG. 4A) of each of lead tab terminals 11, 12, 14, and 15 protrude through opening portion OP1.

Then, a drawing process is performed so as to curl the perimeter of opening portion OP1 of aluminum case 20, to thereby form opening portion OP2 (FIG. 2). Namely, curled portion CL (FIGS. 2 and 3) is formed in aluminum case 20. In forming curled portion CL, opening portion OP1 is caused to contract toward element axis AE (FIG. 3), to thereby implement opening portion OP2. As a result of this drawing process, aluminum case 20 tightens sealing rubber gasket 22. Thus, aluminum case 20 is fixed to sealing rubber gasket 22, and both of them (FIG. 2: sealing portion SE) seal wound stack sheet SH while exposing lead portion 10c and mount portion 10d of each of lead tab terminals 11, 12, 14, and 15. Thereafter, prescribed aging treatment is performed.

Referring to FIGS. 1 and 2, seat plate 24 made of plastic is attached on the side of opening portion OP2 of aluminum case 20. Four openings 24a corresponding to respective positions of lead tab terminals 11, 12, 14, 15 are formed in seat plate 24. In addition, seat plate 24 is attached to capacitor element 2 by inserting lead portion 10c and mount portion 10d (FIGS. 4A and 4B) of each of lead tab terminals 11, 12, 14, 15 in corresponding opening 24a. Then, each mount portion 10d protruding through opening 24a in seat plate 24 is pressed and bent, to thereby complete solid electrolytic capacitor 1A according to the present embodiment.

A method of manufacturing an electrolytic capacitor in a Comparative Example will now be described.

Figure 13:
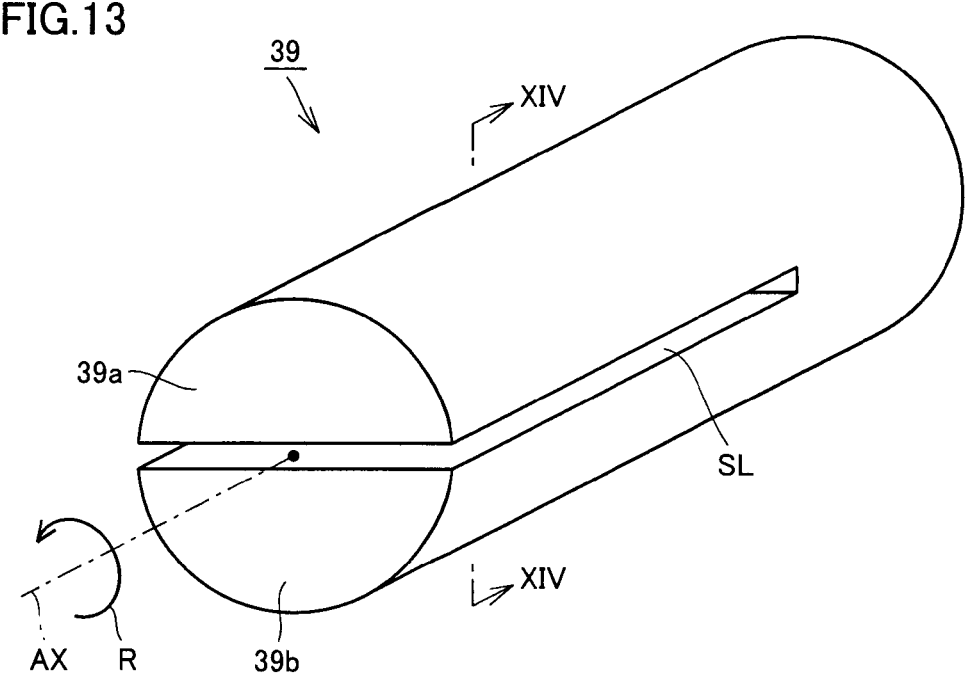
FIG. 13 is a perspective view showing a core employed in a method of manufacturing an electrolytic capacitor in a Comparative Example.
Figure 14:
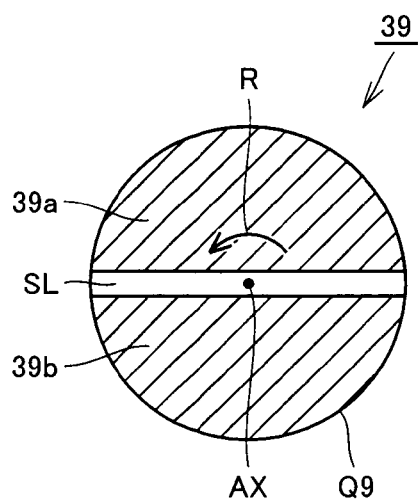
FIG. 14 is a cross-sectional view along the line XIV-XIV in FIG. 13.
Figure 15:
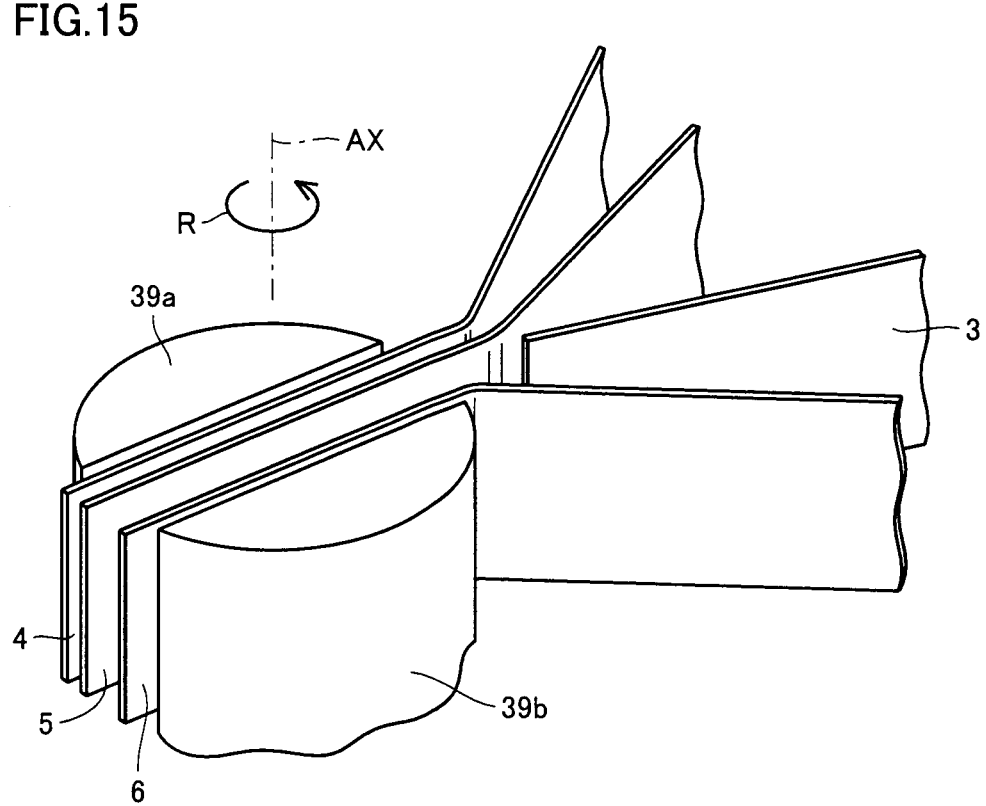
FIG. 15 is a perspective view schematically showing a first step in a method of manufacturing an electrolytic capacitor in Comparative Example.
Figure 16:
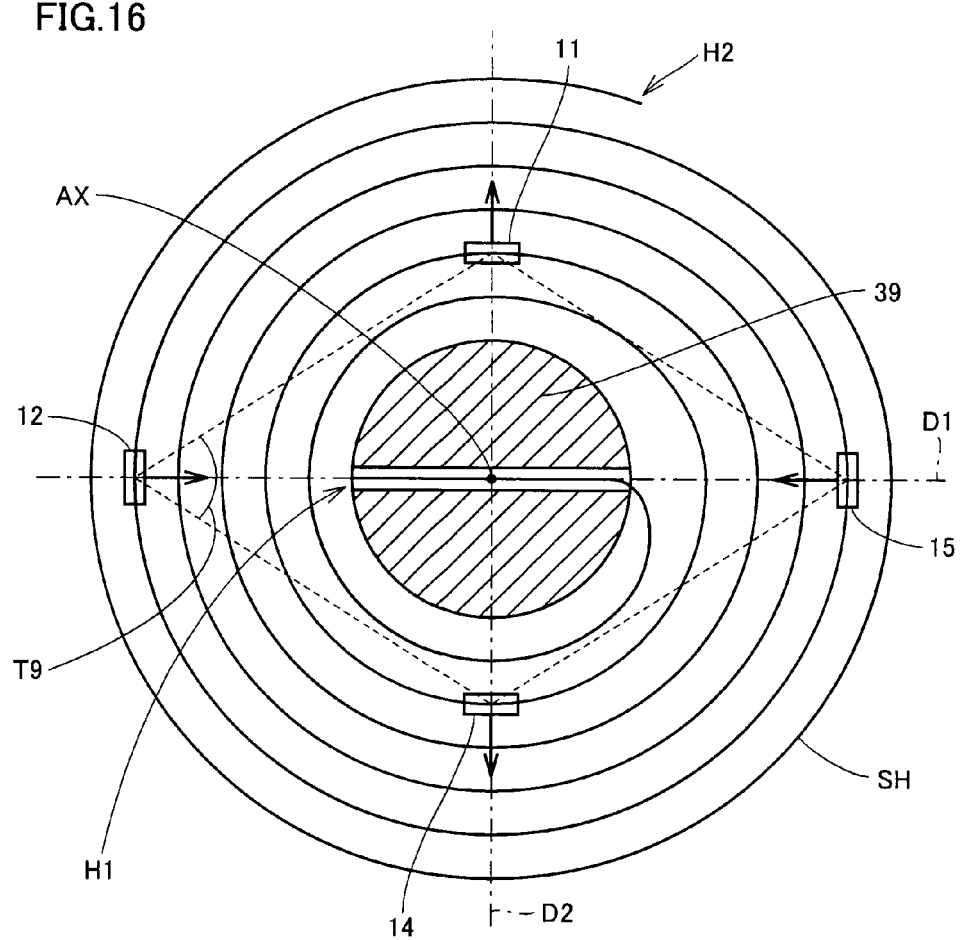
FIG. 16 is a cross-sectional view schematically showing a second step in the method of manufacturing an electrolytic capacitor in Comparative Example.

In a first Comparative Example, instead of core 31 (FIGS. 6 and 7), a core 39 (FIGS. 13 and 14) is employed to wind up (FIG. 15) stack sheet SH (FIG. 5). A cross-section of core 39 has an outer perimeter in a circular shape Q9 (FIG. 14). Therefore, as shown in FIG. 16, a distance between stack sheet SH and core axis AX monotonously increases as winding proceeds. Consequently, a distance between each of second cathode lead tab terminal 15 and second anode lead tab terminal 12 and core axis AX becomes greater than a distance between each of first cathode lead tab terminal 14 and first anode lead tab terminal 11 and core axis AX. In addition, in the present Comparative Example, a standard pressed terminal 100B (FIGS. 23A and 23B), that is, a terminal without shift in shift direction DS (FIG. 4B), is employed as each of first and second cathode lead tab terminals 14 and 15 and first and second anode lead tab terminals 11 and 12.

In the case of the present Comparative Example, due to presence of the difference in distance above and absence of shift in shift direction DS that can compensate for the difference, an angle T9 (FIG. 16) becomes significantly smaller than 90°. Namely, a quadrangle having four terminals at respective vertices is considerably different from a square. Therefore, it is difficult to arrange four terminals in a manner substantially corresponding to four respective vertices of a square having core axis AX in the center. Namely, it is difficult to evenly arrange lead tab terminals 11, 12, 14, and 15 around core axis AX corresponding to element axis AE (FIG. 3).

In addition, each of second cathode lead tab terminal 15 and second anode lead tab terminal 12 is arranged around an outer circumference of the capacitor element. Consequently, curled portion CL formed at the time of attachment of aluminum case 20 is more likely to collide with second cathode lead tab terminal 15 or second anode lead tab terminal 12. Therefore, in order to avoid this collision, a larger case having a larger opening portion should be employed, which results in larger size of an electrolytic capacitor.

In a second Comparative Example, winding as in the first Comparative Example is performed. If one-side pressed terminal 100A instead of standard pressed terminal 100B is employed, however, four lead portions can form a shape close to a square as shown with shift direction DS (an arrow in FIG. 16). In the present Comparative Example, however, difference in distance between each of first and second cathode lead tab terminals 14 and 15 and core axis AX is not so great as in the present embodiment. Therefore, since magnitude of shift along shift direction DS is smaller, it is difficult to reliably avoid the problem of collision with aluminum case 20 described above. This is also the case with first and second anode lead tab terminals 11 and 12.

In contrast, according to the present embodiment, in the cross-section perpendicular to core axis AX (FIG. 7), core 31 has first length L1 along first straight line D1 passing through core axis AX and second length L2 along second straight line D2 passing through core axis AX and orthogonal to first straight line D1, and second length L2 is greater than first length L1. Thus, increase in distance between stack sheet SH (each foil) and core axis AX caused by winding can be increased in a direction along second straight line D2 as shown in FIG. 9. Therefore, in compensating for difference in distance between each of first and second cathode lead tab terminals 14 and 15 arranged at different positions in stack sheet SH and core axis AX, an amount of shift shown with shift direction DS (an arrow in FIG. 9) becomes greater. Therefore, since the lead portion of second cathode lead tab terminal 15 is greatly shifted toward core axis AX (element axis AE), collision of second cathode lead tab terminal 15 with curled portion CL can more reliably be avoided as shown in FIG. 3. Similarly, collision of second anode lead tab terminal 12 with curled portion CL can also be avoided.

Since difference in distance between each of lead portions 11c, 12c, 14c, and 15c and element axis AE is made smaller as described above, each of lead portions 11c, 12c, 14c, and 15c can be arranged in a manner substantially corresponding to four respective vertices of a square having core axis AX in the center. Namely, the lead portions of the four terminals can be arranged in good balance.

When the four terminals can thus be arranged in good balance, for example, concentration of stress on some terminals and lowering in hermeticity in sealing can be prevented. In particular, force applied to each terminal through sealing rubber gasket 22 is desirably as even as possible, in consideration of stress applied to a root of each terminal and hermeticity of sealing portion SE (FIG. 2) in curling aluminum case 20 (FIG. 2). To that end, as described above, the four arranged terminals desirably correspond to respective vertices of a square as much as possible. In addition, in a case where solid electrolytic capacitor 1A is a chip product, that is, in a case where mount portions 11d, 12d, 14d, and 15d are bent along seat plate 24 as shown in FIGS. 1 and 2, concentration of stress on some terminals in this bending step can be prevented. Further, when mount portions 11d, 12d, 14d, and 15d are soldered with a reflow method, tilting of a capacitor with respect to a mount surface can be prevented.

In addition, since one-side pressed terminal 100A identical in a shift amount in shift direction DS is employed as each of lead tab terminals 11, 12, 14, and 15, lead tab terminals 11, 12, 14, and 15 can completely or substantially be common as parts. Therefore, cost for parts can be reduced.

Moreover, since core 31 is in a racetrack shape, that is, in a shape having a curve portion, damage caused by the core on stack sheet SH can be lessened as compared with a case of a polygonal shape.

Dimensions in one example of the present embodiment are as follows. Anode foil 3 has a thickness of 110 μm and a length of 132 mm. Cathode foil 4 has a thickness of 30 μm and a length of 150 mm. Each of sheets of separator paper 5 and 6 has a thickness of 30 μm and a length of 160 mm. In addition, an amount of shift in shift direction DS (FIG. 4B) is 0.3 mm. A cross-section of core 31 has length L1=0.7 mm and length L2=1.4 mm, and the curve portion of the racetrack shape has a radius of curvature of 0.7 mm. In addition, the cross-section of capacitor element 2 has length K1=6.4 mm and length K2=7.1 mm.

A result of verification of functions and effects of the present embodiment will now be described.

As Example under the dimension conditions above, 300 solid electrolytic capacitors 1A were manufactured. Consequently, angle T1 (FIG. 3) of all samples was within the range of 90°±20°. In addition, a distance between first cathode lead tab terminal 14 and first anode lead tab terminal 11 was 3.7 mm on average, and a distance between second cathode lead tab terminal 15 and second anode lead tab terminal 12 was also 3.7 mm on average.

In a case representing first Comparative Example above where circular core 39 (FIGS. 13 to 15) and standard pressed terminal 100B were employed, in 15 samples of 300 samples, angle T1 (FIG. 3) was not within the range of 90°±20°. In addition, a distance between first cathode lead tab terminal 14 and first anode lead tab terminal 11 was 3.5 mm on average, and a distance between second cathode lead tab terminal 15 and second anode lead tab terminal 12 was 4.4 mm on average.

In a case representing second Comparative Example above where circular core 39 (FIGS. 13 to 15) and one-side pressed terminal 100A were employed, angle T1 (FIG. 3) of all samples was within the range of 90°±20°. In addition, a distance between first cathode lead tab terminal 14 and first anode lead tab terminal 11 was 3.9 mm on average, and a distance between second cathode lead tab terminal 15 and second anode lead tab terminal 12 was also 3.9 mm on average. It is noted that an amount of shift of one-side pressed terminal 100A in shift direction DS was optimized in order to arrange lead tab terminals 11, 12, 14, and 15 as evenly as possible.

As a result of verification above, it was found that, according to Example, lead tab terminals 11, 12, 14, and 15 could evenly be arranged and a size of solid electrolytic capacitor 1A could be made smaller because a distance between the terminals is small.

It is noted that a pair of straight line portions (second straight line portion) opposed to each other along second straight line D2 and extending in parallel to first straight line D1 may be provided instead of straight line portion G1 (FIG. 7) in the present embodiment. In this case, a pair of curve portions (second curve portion) opposed to each other along first straight line D1 and being convex outward may be provided.

In addition, though one-side pressed terminal 100A identical in an amount of shift in shift direction DS was employed as each of lead tab terminals 11, 12, 14, and 15 in the present embodiment, an amount of shift of each of lead tab terminals 11, 12, 14, and 15 may individually be adjusted. In this case, though cost for parts increases, arrangement of each of lead tab terminals 11, 12, 14, and 15 can individually be adjusted.

(Second Embodiment)

In the first embodiment, core 31 (FIGS. 6 and 7) having a cross-section substantially in racetrack shape Q1 was employed. In the present embodiment, unlike core 31, a core having a cross-section in a substantially rectangular shape is employed. Except for this point, solid electrolytic capacitor 1A is manufactured in a manufacturing process substantially the same as in the first embodiment. The difference above will be described below in detail.

Figure 17:
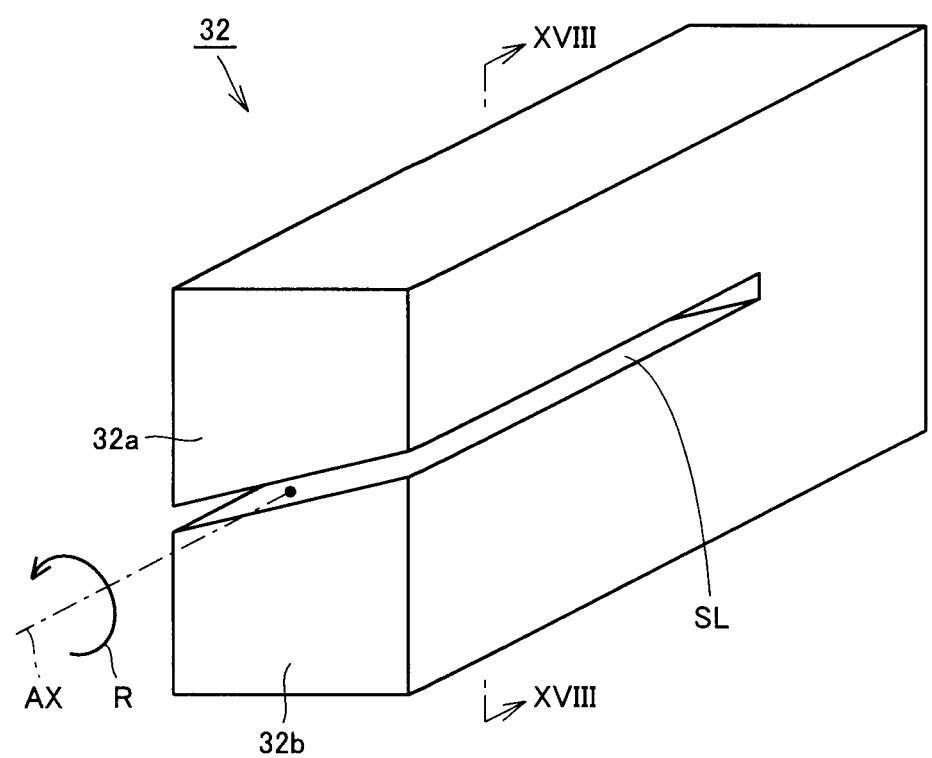
FIG. 17 is a perspective view schematically showing a first step in a method of manufacturing an electrolytic capacitor in a second embodiment of the present invention.
Figure 18:
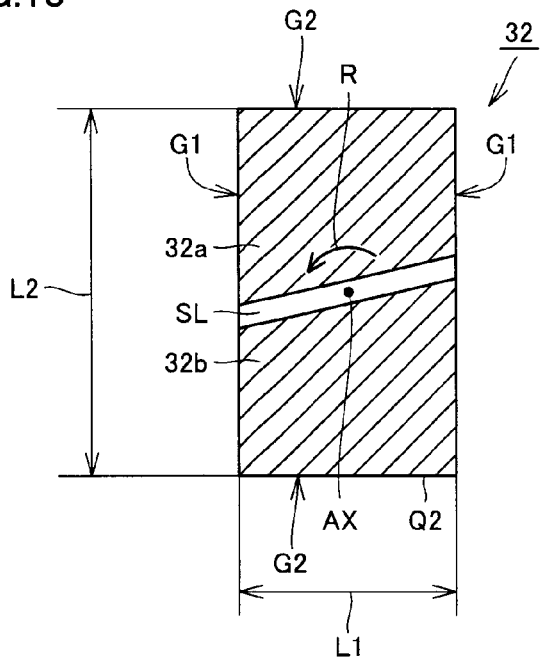
FIG. 18 is a schematic cross-sectional view along the line XVIII-XVIII in FIG. 17.
Figure 19:
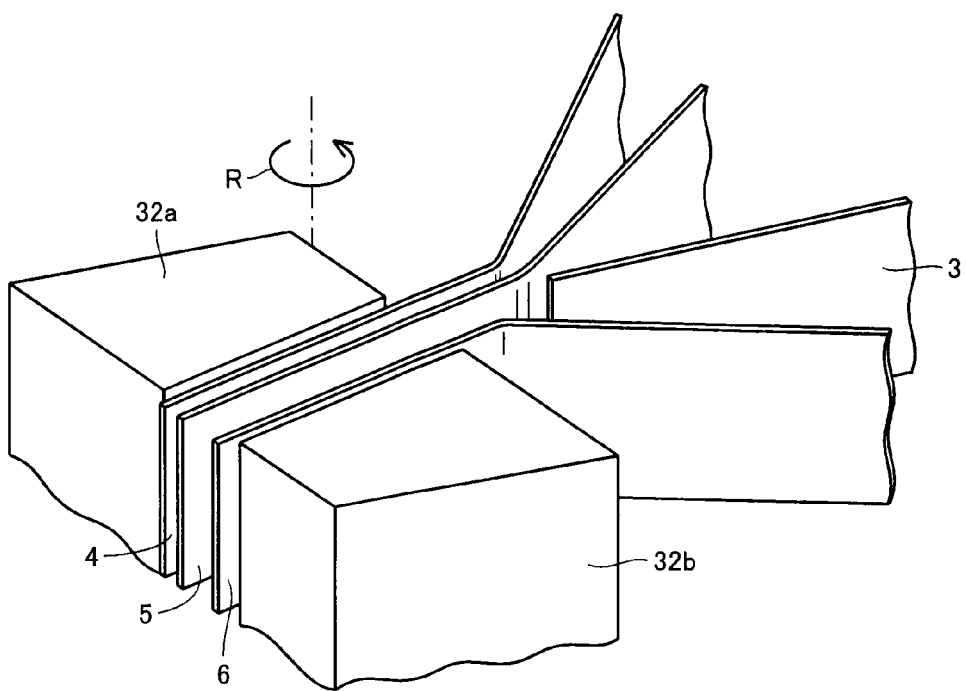
FIG. 19 is a perspective view schematically showing a second step in the method of manufacturing an electrolytic capacitor in the second embodiment of the present invention.
Figure 20:
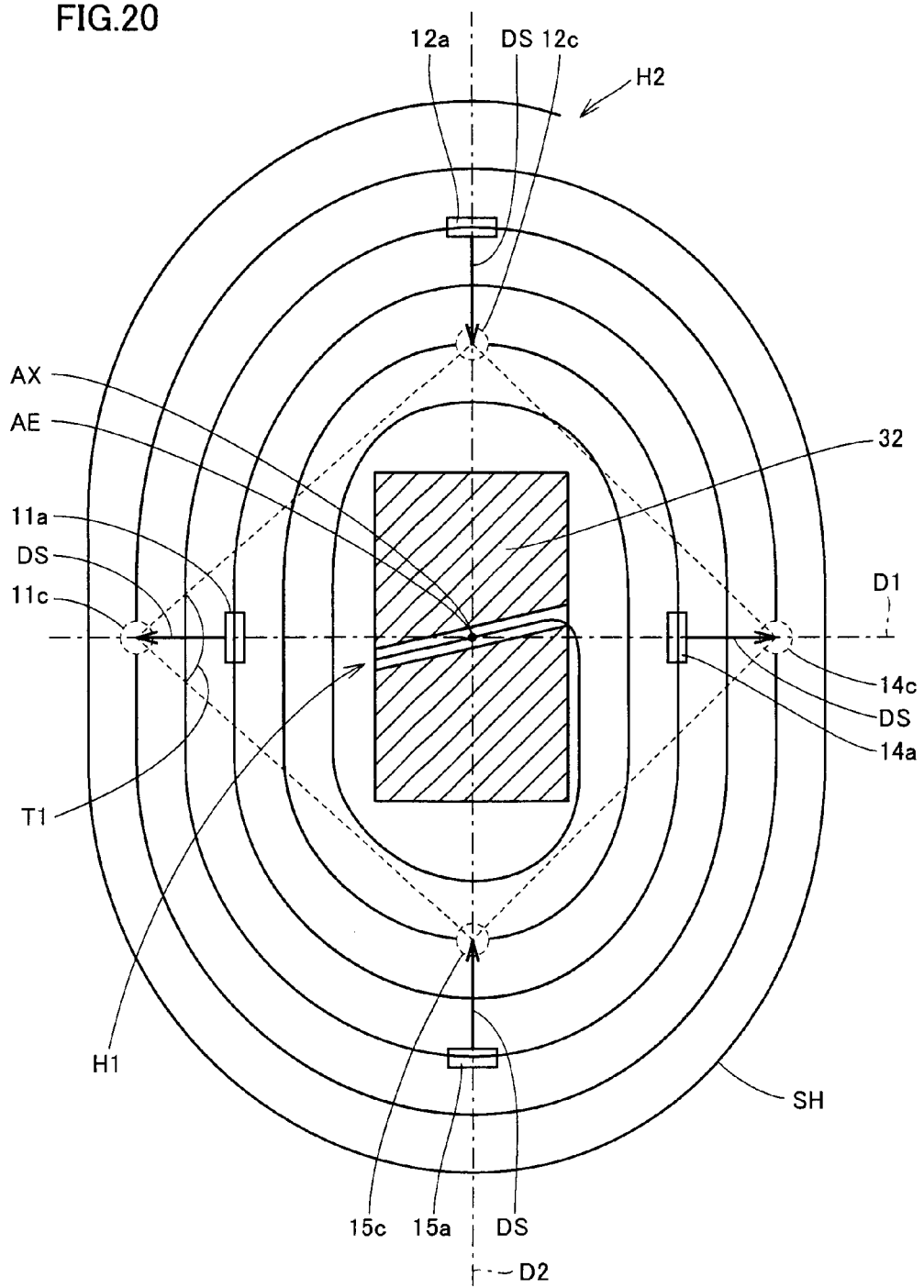
FIG. 20 is a cross-sectional view schematically showing a third step in the method of manufacturing an electrolytic capacitor in the second embodiment of the present invention.

Referring to FIGS. 17 to 19, a core 32 is prepared in the present embodiment. A one end portion of core 32 on core axis AX (an end portion in lower left in FIG. 17) is divided into first and second portions 32a and 32b by slit SL. In addition, as shown in FIG. 18, a cross-section of core 32 perpendicular to core axis AX has an outer perimeter corresponding to a rectangle Q2. Rectangle Q2 has an additional pair of straight line portions G2 (second straight line portion) in addition to the pair of straight line portions G1. A corner portion of rectangle Q2 is preferably beveled in order not to damage a foil to be wound around core 32. It is noted that rectangle Q2 herein is a shape defined regardless of presence of slit SL and a curved portion beveled as above. Winding (FIGS. 19 and 20) substantially the same as in the first embodiment (FIGS. 8 and 9) is performed with the use of core 32.

According to the present embodiment as well, functions and effects substantially the same as in the first embodiment can be obtained. In addition, unlike core 31 in the first embodiment, core 32 employed in the present embodiment has both of the pair of straight line portions G1 and the pair of straight line portions G2 (FIG. 18). Thus, displacement of a position of a terminal from a desired position can further be suppressed. The reason will be described below with reference to FIGS. 21 and 22. Since FIGS. 21 and 22 are conceptual diagrams for illustrating relationship of force between each terminal and a core, stack sheet SH (FIGS. 9 and 20) is not shown.

Figure 21:
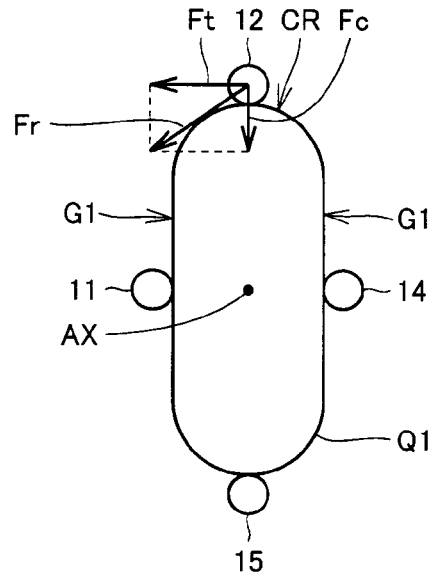
FIG. 21 is an illustrative diagram schematically showing how force is applied to an electrode lead in a case where a core having a racetrack-shaped cross-section is employed in a method of manufacturing an electrolytic capacitor.

Referring mainly to FIG. 21, in a case where anode foil 3, cathode foil 4, and sheets of separator paper 5 and 6 are wound around core 31 (FIG. 7), force toward core axis AX of core 31 is applied to each of lead tab terminals 11, 12, 14, and 15. For example, force Fc toward core axis AX is applied to second anode lead tab terminal 12. This force Fc is force Fc pressing second anode lead tab terminal 12 against core 31, and this force Fc alone does not seem to cause displacement of second anode lead tab terminal 12. Depending on tension variation in anode foil 3 or cathode foil 4, however, force along the outer perimeter of core 31 may be applied to each of lead tab terminals 11, 12, 14, and 15. For example, force Ft may be applied to second anode lead tab terminal 12 depending on tension variation in anode foil 3. Consequently, resultant force Fr of force Fc and force Ft is applied to second anode lead tab terminal 12. Here, since core 31 has the outer perimeter in racetrack shape Q1, it has a curve portion CR and slight position displacement of second anode lead tab terminal 12 located on a curved surface of core 31 corresponding to this curve portion CR may be caused by resultant force Fr.

Figure 22:
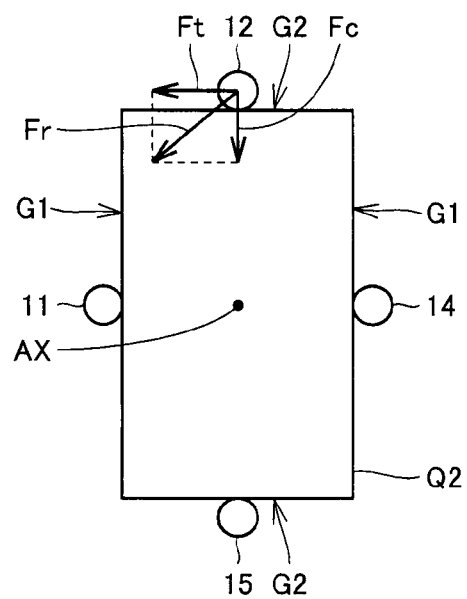
FIG. 22 is an illustrative diagram schematically showing how force is applied to an electrode lead in the method of manufacturing an electrolytic capacitor in the second embodiment of the present invention.

Referring to FIG. 22, in contrast, core 32 in the present embodiment has the outer perimeter in a shape of rectangle Q2 and hence it has the pair of straight line portions G2. Second anode lead tab terminal 12 located on a flat surface of core 32 corresponding to this straight line portion G2 is stable even under resultant force Fr. Similarly, position displacement of each of three other lead tab terminals 11, 14 and 15 is less likely as they are arranged on three other sides of rectangle Q2, respectively. Therefore, according to the present embodiment, accuracy in arrangement of all of four lead tab terminals 11, 12, 14, and 15 is improved.

Referring again to FIG. 21, even in a case of using core 31, for the reasons the same as described above, accuracy in arrangement of first anode lead tab terminal 11 and first cathode lead tab terminal 14 can be improved by the presence of the pair of straight line portions G1. In addition, as a variation of core 31, in a case where the pair of straight line portions G1 is changed to a curved shape and the pair of curve portions CR is changed to a straight-line shape with lengths L1 and L2 (FIG. 7) being maintained, accuracy in arrangement of second anode lead tab terminal 12 and second cathode lead tab terminal 15 is improved. Comparing core 31 (FIG. 7) and the variation described above with each other, the former is preferred because core 31 can ensure a long length of the straight line portion.

Dimensions in one example of the present embodiment are as follows. A cross-section of core 32 has length L1=0.7 mm and length L2=1.4 mm. Other dimensions are the same as exemplified in the first embodiment.

As Example under the dimension conditions above, 300 solid electrolytic capacitors 1A were manufactured. Consequently, angle T1 (FIG. 3) of all samples was within the range of 90°±20°. In addition, a distance between first cathode lead tab terminal 14 and first anode lead tab terminal 11 was 3.7 mm on average, and a distance between second cathode lead tab terminal 15 and second anode lead tab terminal 12 was also 3.7 mm on average. Namely, it was found that, as in Example of the first embodiment, similar functions and effects are obtained also in Example of the present embodiment.

(Third Embodiment)

Figure 23A:
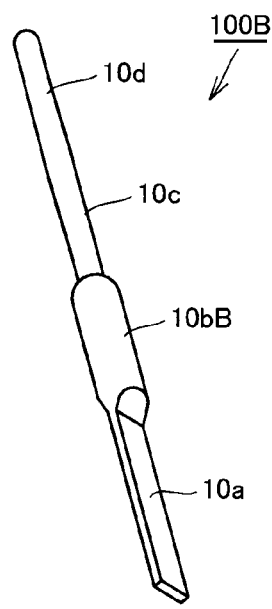
FIGS. 23A and 23B are a perspective view and a side view schematically showing a construction of a terminal prepared in one step in a method of manufacturing an electrolytic capacitor in a third embodiment of the present invention, respectively.
Figure 23B:
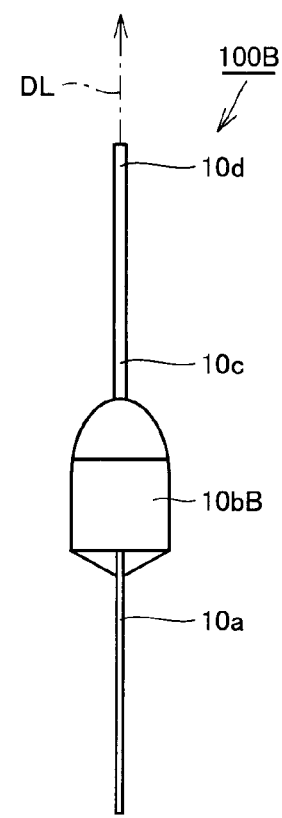

Referring to FIGS. 23A and 23B, in the present embodiment, standard pressed terminal 100B is employed instead of one-side pressed terminal 100A (FIGS. 4A and 4B) as each of first cathode lead tab terminal 14 and first anode lead tab terminal 11. Standard pressed terminal 100B has a boss portion 10$b$B instead of boss portion 10$B$A (FIGS. 4A and 4B), so that connection portion 10$a$ and lead portion 10$c$ extend along one straight line (in lead direction DL in FIG. 23B). Since standard pressed terminal 100B has conventionally widely been used, it is readily available. The present embodiment is otherwise substantially the same as the first or second embodiment.

According to the present embodiment, when two-dimensionally viewed (FIG. 3), lead portions 11$c$ and 14$c$ are arranged at positions the same as those of connection portions 11$a$ and 14$a$, respectively. Therefore, in a case where lead portions 11$c$, 12$c$, 14$c$, and 15$c$ are arranged in a manner corresponding to respective vertices of a square, each of lead portions 12$c$ and 15$c$ is shifted toward element axis AE more than in the first embodiment. Therefore, collision of lead portions 12$c$ and 15$c$ with curled portion CL can more reliably be prevented.

(Fourth Embodiment)

Figure 24:
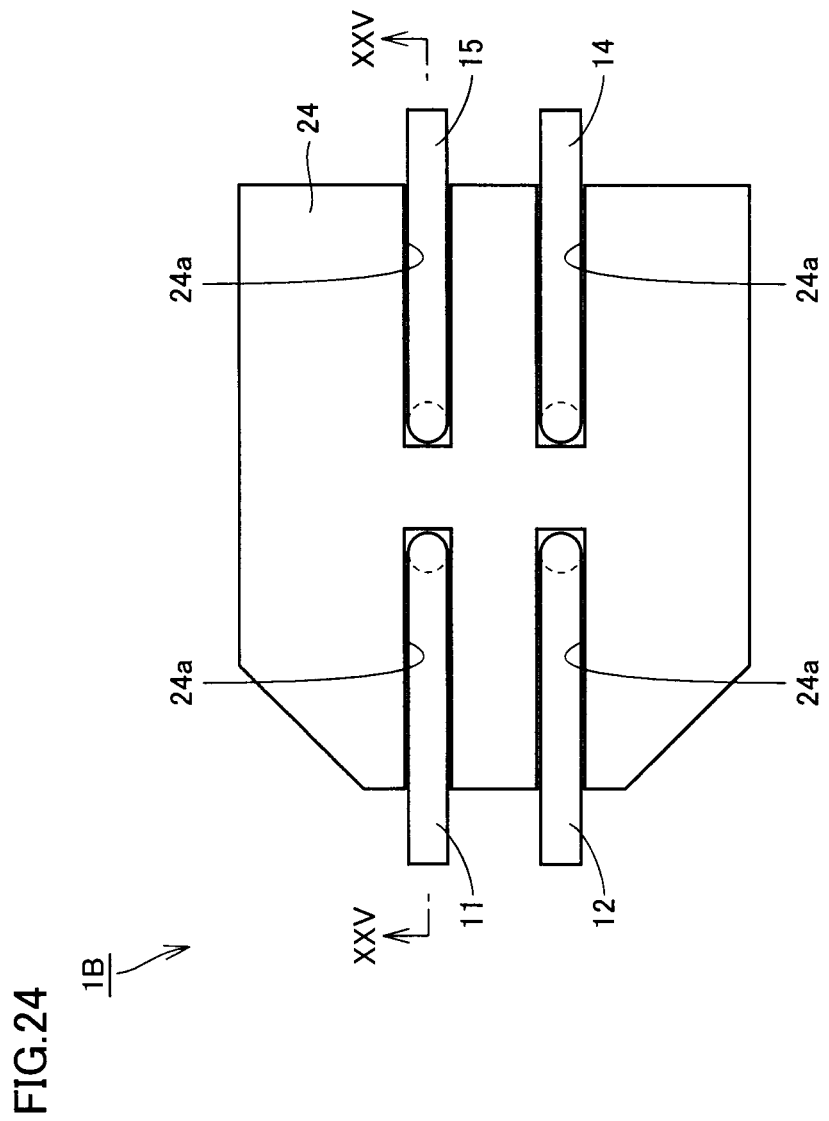
FIG. 24 is a plan view schematically showing a construction of an electrolytic capacitor in a fourth embodiment of the present invention.
Figure 25:
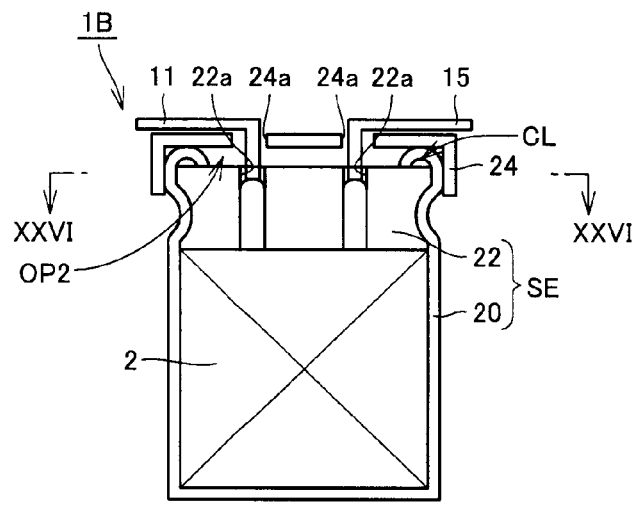
FIG. 25 is a schematic cross-sectional view along the line XXV-XXV in FIG. 24.

Referring to FIGS. 24 and 25, in a solid electrolytic capacitor 1B (electrolytic capacitor) according to the present embodiment, at least any terminal among the four terminals of first and second cathode lead tab terminals 14 and 15 and first and second anode lead tab terminals 11 and 12 has a construction of one-side pressed terminal 100A (FIGS. 4A and 4B) and other terminal(s) has (have) a construction of standard pressed terminal 100B (FIGS. 23A and 23B). It is noted that all of the four terminals may be implemented by one-side pressed terminal 100A. Shift direction DS and an amount of shift of each one-side pressed terminal 100A in capacitor element 2 can be adjusted as appropriate, for the purpose of more evenly arranging lead tab terminals 11, 12, 14, and 15 with respect to element axis AE or for the purpose of preventing any of lead tab terminals 11, 12, 14, and 15 from colliding with curled portion CL.

Figure 26:
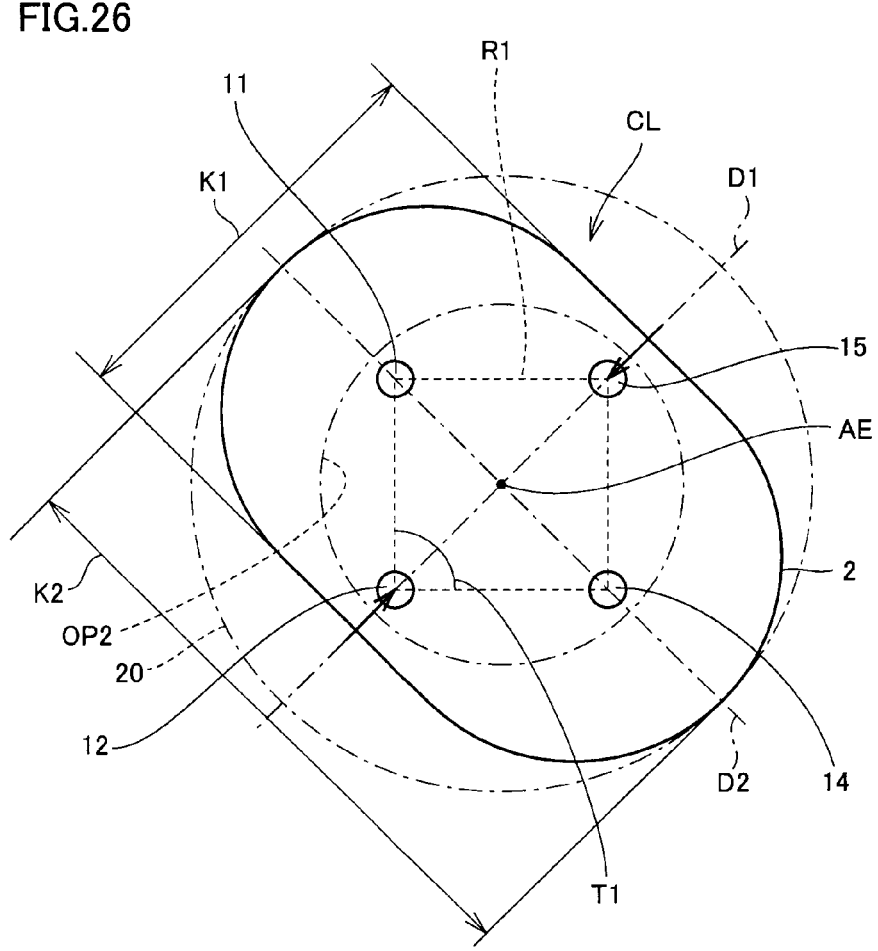
FIG. 26 is a diagram schematically showing a capacitor element and arrangement of an electrode lead terminal, along the line XXVI-XXVI in FIG. 25.

Referring to FIG. 26, first straight line D1 lies between first cathode lead tab terminal 14 and first anode lead tab terminal 11, and second straight line D2 lies between second cathode lead tab terminal 15 and second anode lead tab terminal 12.

Since the construction is otherwise substantially the same as in the first embodiment described above, the same or corresponding elements have the same reference characters allotted and description thereof will not be provided.

A method of manufacturing solid electrolytic capacitor 1B in the present embodiment will now be described.

Initially, lead tab terminals 11, 12, 14, and 15 are attached substantially as in the step in FIG. 5 in the first embodiment. It is noted that this attachment is finely adjusted such that each terminal is arranged as shown in FIG. 26 when anode foil 3 and cathode foil 4 are wound as will be described later. Then, anode foil 3 and cathode foil 4 are layered with separator paper 5 being interposed. In addition, separator paper 6 is layered on anode foil 3. Namely, stack sheet SH having anode foil 3, cathode foil 4 and sheets of separator paper 5 and 6 is prepared. It is noted that this layering may be performed simultaneously with winding which will be described later.

Then, as in the step in FIG. 8 in the first embodiment, one end H1 (FIG. 5: the vicinity of position P0) of each of anode foil 3, cathode foil 4 and sheets of separator paper 5 and 6 is inserted in slit SL in core 31. Then, core 31 is turned around core axis AX as shown with arrow R in FIGS. 6 to 8. Thus, separator paper 6, anode foil 3, separator paper 5, and cathode foil 4 start to be wound around core 31 as they are layered.

Figure 27:
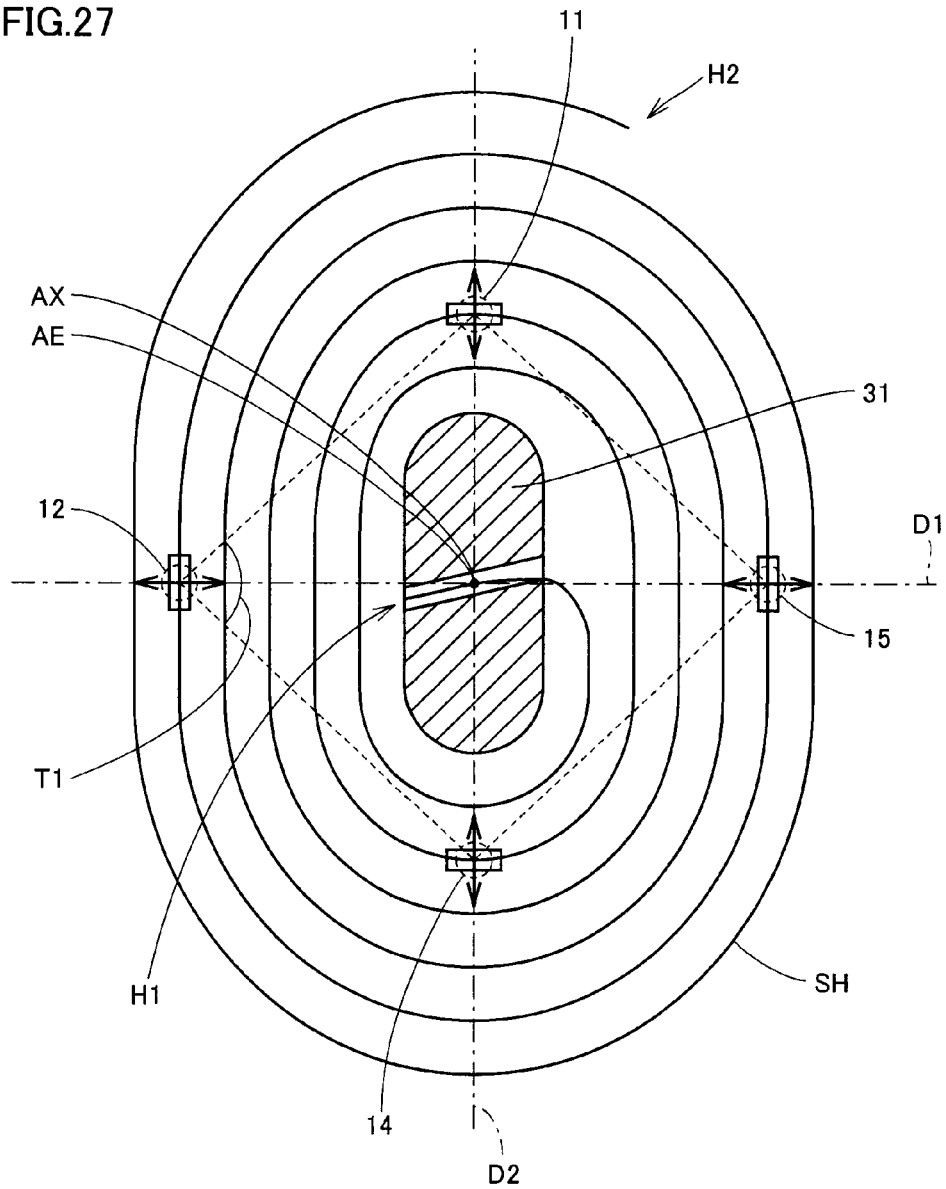
FIG. 27 is a cross-sectional view schematically showing one step in a method of manufacturing an electrolytic capacitor in the fourth embodiment of the present invention.

Referring mainly to FIG. 27, stack sheet SH (FIG. 5: anode foil 3, cathode foil 4, and sheets of separator paper 5 and 6) is wound around core 31. Thus, cathode foil 4 and anode foil 3 are together wound around core 31 from one end H1 of each of cathode foil 4 and anode foil 3. This winding is performed such that, when viewed in cross-section, first straight line D1 lies between first cathode lead tab terminal 14 and first anode lead tab terminal 11 and second straight line D2 lies between second cathode lead tab terminal 15 and second anode lead tab terminal 12. In order to arrange each terminal as such, a position of attachment of each terminal (FIG. 5) should only finely be adjusted.

Solid electrolytic capacitor 1B in the present embodiment is completed by thereafter performing the steps as in the steps in FIGS. 10 to 12 in the first embodiment.

The present embodiment will now be compared with first and second Comparative Examples (FIGS. 13 to 16) described previously.

In first Comparative Example described previously, the distance between each of second cathode lead tab terminal 15 and second anode lead tab terminal 12 and core axis AX is greater than the distance between each of first cathode lead tab terminal 14 and first anode lead tab terminal 11 and core axis AX. Therefore, it is difficult to evenly arrange lead tab terminals 11, 12, 14, and 15 around element axis AE (FIG. 26) corresponding to core axis AX.

In contrast, according to the method of manufacturing solid electrolytic capacitor 1B in the present embodiment, in the cross-section perpendicular to core axis AX (FIG. 7), core 31 has first length L1 along first straight line D1 passing through core axis AX and second length L2 along second straight line D2 passing through core axis AX and orthogonal to first straight line D1, and first length L1 is smaller than second length L2. With first length L1 being thus smaller, increase in distance between stack sheet SH (each foil) and core axis AX caused by winding can be compensated for in a direction along first straight line D1 as shown in FIG. 27. Therefore, difference in distance between each of first and second cathode lead tab terminals 14 and 15 arranged at different positions in stack sheet SH and core axis AX can be suppressed. Similarly, difference in distance between each of first and second anode lead tab terminals 11 and 12 and core axis AX can be suppressed. Thus, difference in distance between each of lead tab terminals 11, 12, 14, and 15 and core axis AX can be suppressed. Therefore, as shown in FIG. 26, lead tab terminals 11, 12, 14, and 15 can be arranged in a manner substantially corresponding to four respective vertices of a square having element axis AE in the center. Namely, the lead tab terminals can more evenly be arranged.

When the four terminals can thus be arranged in good balance, for example, concentration of stress on some terminals and lowering in hermeticity in sealing can be prevented. In particular, force applied to each terminal through sealing rubber gasket 22 is desirably as even as possible, in consideration of stress applied to a root of each terminal and hermeticity of sealing portion SE (FIG. 25) in curling aluminum case 20 (FIG. 25). To that end, as described above, the four arranged terminals desirably correspond to respective vertices of a square as much as possible. In addition, in a case where solid electrolytic capacitor 1B is a chip product, that is, in a case where each terminal is bent along seat plate 24 as shown in FIGS. 24 and 25, concentration of stress on some terminals in this bending can be prevented. Further, when solid electrolytic capacitor 1B is soldered with a reflow method, tilting of a capacitor with respect to a mount surface can be prevented.

In addition, according to the present embodiment, first length K1 (FIG. 26) of capacitor element 2 is also made smaller in correspondence with small first length L1 (FIG. 7) of core 31. Thus, as shown with an arrow in FIG. 26, each of second cathode lead tab terminal 15 and second anode lead tab terminal 12 is closer to element axis AE. Therefore, curled portion CL (FIG. 26) formed in order to fix aluminum case 20 (FIG. 26) is less likely to collide with second cathode lead tab terminal 15 or second anode lead tab terminal 12. Thus, small aluminum case 20 having a smaller opening portion can be employed. Therefore, a size of solid electrolytic capacitor 1B can be reduced.

Moreover, according to the present embodiment, at least any of lead tab terminals 11, 12, 14, and 15 has such a construction that lead portion 10c is shifted with respect to connection portion 10a in shift direction DS. Namely, a position of lead portion 10c of at least any of lead tab terminals 11, 12, 14, and 15 (a position shown with a dashed circle in FIG. 27) can finely be adjusted as shown with an arrow in FIG. 27. Therefore, an effect of more evenly arranging each lead portion 10c with respect to element axis AE or an effect of more reliably avoiding collision above or both of these effects can more reliably be achieved.

Dimensions in one example of the present embodiment are as follows. Anode foil 3 has a thickness of 110 μm and a length of 130 mm. Cathode foil 4 has a thickness of 30 μm and a length of 150 mm. Each of sheets of separator paper 5 and 6 has a thickness of 30 μm and a length of 160 mm. A cross-section of core 31 has length L1=1.0 mm and length L2=1.8 mm, and the curve portion of racetrack shape Q1 has a radius of curvature of 0.9 mm. In addition, the cross-section of capacitor element 2 has length K1=6.5 mm and length K2=7.2 mm.

A result of verification of functions and effects of the present embodiment will now be described. Under the dimension conditions above, 300 solid electrolytic capacitors 1B were manufactured as Example of the present embodiment. Consequently, angle T1 (FIG. 26) of all samples was within the range of 90°±20°. In contrast, in a case representing Comparative Example where circular core 39 (FIGS. 13 to 15) was employed, in 15 samples of 300 samples, angle T1 (FIG. 3) was not within the range of 90°±20°. Namely, probability that four terminals are arranged in a manner substantially corresponding to four respective vertices of a square was higher in Example than Comparative Example.

It is noted that a pair of straight line portions (second straight line portion) opposed to each other along second straight line D2 and extending in parallel to first straight line D1 may be provided instead of straight line portion G1 (FIG. 7) in the present embodiment. In this case, a pair of curve portions (second curve portion) opposed to each other along first straight line D1 and being convex outward may be provided.

(Fifth Embodiment)

Figure 28:
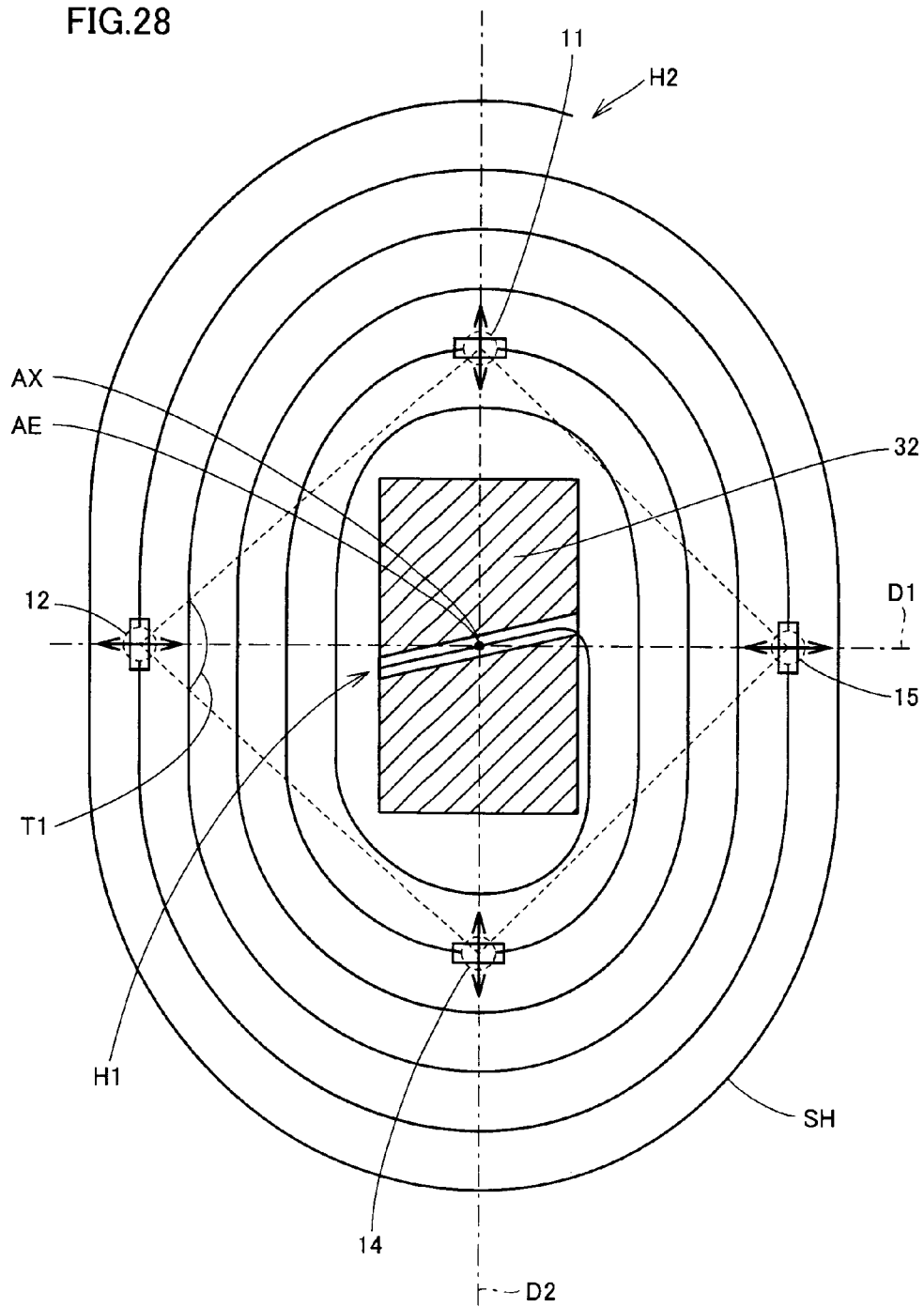
FIG. 28 is a cross-sectional view schematically showing one step in a method of manufacturing an electrolytic capacitor in a fifth embodiment of the present invention.

Though core 31 (FIGS. 6 and 7) was employed in the fourth embodiment above, core 32 (FIGS. 17 and 18) is used in the present embodiment to perform winding shown in FIG. 28. Except for this point, solid electrolytic capacitor 1B is manufactured in a manufacturing process substantially the same as in the fourth embodiment.

According to the present embodiment as well, the functions and effects substantially the same as in the fourth embodiment are obtained. In addition, for the reasons the same as described with reference to FIGS. 21 and 22 in the second embodiment, displacement of a position of a lead tab terminal from a desired position can further be suppressed.

Dimensions in one example of the present embodiment are as follows. Anode foil 3 has a thickness of 110 μm and a length of 130 mm. Cathode foil 4 has a thickness of 30 μm and a length of 150 mm. Each of sheets of separator paper 5 and 6 has a thickness of 30 μm and a length of 160 mm. A cross-section of core 32 has length L1=1.0 mm and length L2=1.8 mm. In addition, the cross-section of capacitor element 2 has length K1=6.5 mm and length K2=7.2 mm.

A result of verification of functions and effects of the present embodiment will now be described. Under the dimension conditions above, 300 solid electrolytic capacitors 1B were manufactured as Example of the present embodiment. Consequently, angle T1 (FIG. 26) of all samples was within the range of 90°±20°. In contrast, in a case representing Comparative Example where circular core 39 (FIGS. 13 to 15) was employed, in 15 samples of 300 samples, angle T1 (FIG. 3) was not within the range of 90°±20°. Namely, probability that four terminals are arranged in a manner substantially corresponding to four respective vertices of a square was higher in Example than Comparative Example.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A method of manufacturing an electrolytic capacitor, comprising the steps of:
    preparing a cathode foil which has one end;
    preparing an anode foil which has one end;
    preparing four terminals as first and second cathode lead terminals and first and second anode lead terminals, respectively, each of said four terminals having a connection portion and a lead portion, each of said connection portion and said lead portion extending in a lead direction, at least any of said second cathode lead terminal and said second anode lead terminal having such a construction that said lead portion is shifted with respect to said connection portion in a shift direction orthogonal to said lead direction;
    attaching said four terminals, said connection portion of each of said first and second cathode lead terminals being attached to said cathode foil, said connection portion of each of said first and second anode lead terminals being attached to said anode foil, said first cathode lead terminal being arranged closer to said one end of said cathode foil than said second cathode lead terminal and said first anode lead terminal being arranged closer to said one end of said anode foil than said second anode lead terminal;
    preparing a core which has a core axis, said core having, in a cross-section perpendicular to said core axis, a first length along a first straight line which passes through said core axis and a second length along a second straight line which passes through said core axis and is orthogonal to said first straight line, said first length being smaller than said second length;
    forming a capacitor element which has an element axis located in correspondence with said core axis by winding said cathode foil and said anode foil together around said core from said one end of each of said cathode foil and said anode foil after said step of attaching said four terminals, said step of forming a capacitor element being performed such that, in said cross-section, said second straight line lies between said first cathode lead terminal and said first anode lead terminal and said first straight line lies between said second cathode lead terminal and said second anode lead terminal and such that said shift direction of at least any of said second cathode lead terminal and said second anode lead terminal has a component toward said core axis;
    removing said core after said step of forming a capacitor element; and
    sealing said cathode foil and said anode foil while exposing said lead portion of each of said four terminals, after said step of removing said core,
    said sealing step including the steps of
        preparing a case which has an opening portion,
        accommodating said cathode foil and said anode foil in said case through said opening portion such that said lead portion of each of said four terminals protrudes through said opening portion, and
        fixing said case by causing said opening portion to contract toward said element axis.

2. The method of manufacturing an electrolytic capacitor according to claim 1, wherein
    said step of preparing four terminals is performed such that at least any of said first cathode lead terminal and said first anode lead terminal has said construction, and
    said step of forming a capacitor element is performed such that said shift direction of at least any of said first cathode lead terminal and said first anode lead terminal has a component directed away from said core axis.

3. The method of manufacturing an electrolytic capacitor according to claim 2, wherein
    a distance by which said lead portion of at least any of said second cathode lead terminal and said second anode lead terminal is shifted and a distance by which said lead portion of at least any of said first cathode lead terminal and said first anode lead terminal is shifted are equal to each other.

4. The method of manufacturing an electrolytic capacitor according to claim 1, wherein
    said connection portion and said lead portion of at least any of said first cathode lead terminal and said first anode lead terminal extend along an identical straight line.

5. The method of manufacturing an electrolytic capacitor according to claim 1, wherein
    said cross-section of said core has at least any pair of a pair of first straight line portions and a pair of second straight line portions, said first straight line portions are opposed to each other along said first straight line and extend in parallel to said second straight line, and said second straight line portions are opposed to each other along said second straight line and extend in parallel to said first straight line.

6. The method of manufacturing an electrolytic capacitor according to claim 5, wherein
    said cross-section of said core has said pair of first straight line portions and said pair of second straight line portions.

7. The method of manufacturing an electrolytic capacitor according to claim 1, wherein
    said cross-section of said core has at least any pair of a pair of first curve portions and a pair of second curve portions, said first curve portions are opposed to each other along said second straight line and convex outward, and said second curve portions are opposed to each other along said first straight line and convex outward.

8. A method of manufacturing an electrolytic capacitor, comprising the steps of:
    preparing a cathode foil which has one end;

preparing an anode foil which has one end;

preparing four terminals as first and second cathode lead terminals and first and second anode lead terminals, respectively, each of said four terminals having a connection portion and a lead portion, each of said connection portion and said lead portion extending in a lead direction, at least any of said four terminals having such a construction that said lead portion is shifted with respect to said connection portion in a shift direction orthogonal to said lead direction;

attaching said four terminals, said connection portion of each of said first and second cathode lead terminals being attached to said cathode foil, said connection portion of each of said first and second anode lead terminals being attached to said anode foil, said first cathode lead terminal being arranged closer to said one end of said cathode foil than said second cathode lead terminal and said first anode lead terminal being arranged closer to said one end of said anode foil than said second anode lead terminal;

preparing a core which has a core axis, said core having, in a cross-section perpendicular to said core axis, a first length along a first straight line which passes through said core axis and a second length along a second straight line which passes through said core axis and is orthogonal to said first straight line, said first length being smaller than said second length;

forming a capacitor element which has an element axis located in correspondence with said core axis by winding said cathode foil and said anode foil together around said core from said one end of each of said cathode foil and said anode foil after said step of attaching said four terminals, said step of forming a capacitor element being performed such that, in said cross-section, said first straight line lies between said first cathode lead terminal and said first anode lead terminal and said second straight line lies between said second cathode lead terminal and said second anode lead terminal;

removing said core after said step of forming a capacitor element; and sealing said cathode foil and said anode foil while exposing said lead portion of each of said four terminals, after said step of removing said core, said sealing step including the steps of preparing a case which has an opening portion, accommodating said cathode foil and said anode foil in said case through said opening portion such that said lead portion of each of said four terminals protrudes through said opening portion, and fixing said case by causing said opening portion to contract toward said element axis.

9. The method of manufacturing an electrolytic capacitor according to claim 8, wherein said cross-section of said core has at least any pair of a pair of first straight line portions and a pair of second straight line portions, said first straight line portions are opposed to each other along said first straight line and extend in parallel to said second straight line, and said second straight line portions are opposed to each other along said second straight line and extend in parallel to said first straight line.

10. The method of manufacturing an electrolytic capacitor according to claim 9, wherein said cross-section of said core has said pair of first straight line portions and said pair of second straight line portions.

11. The method of manufacturing an electrolytic capacitor according to claim 8, wherein said cross-section of said core has at least any pair of a pair of first curve portions and a pair of second curve portions, said first curve portions are opposed to each other along said second straight line and convex outward, and said second curve portions are opposed to each other along said first straight line and convex outward.

* * * * *